(12) United States Patent
Go

(10) Patent No.: US 7,305,448 B2
(45) Date of Patent: Dec. 4, 2007

(54) INFORMATION-PRESENTING APPARATUS, INFORMATION-PRESENTING METHOD, INFORMATION-PROCESSING APPARATUS, INFORMATION-PROCESSING METHOD AND PROGRAM-STORING MEDIUM

(75) Inventor: Naomi Go, Kanagawa (JP)

(73) Assignee: Sony Corporation, Tokyo (JP)

( * ) Notice: Subject to any disclaimer, the term of this patent is extended or adjusted under 35 U.S.C. 154(b) by 622 days.

(21) Appl. No.: 09/854,475

(22) Filed: May 15, 2001

(65) Prior Publication Data

US 2002/0010642 A1   Jan. 24, 2002

(30) Foreign Application Priority Data

May 16, 2000   (JP)   ............... P2000-142633

(51) Int. Cl.
  G06F 15/16   (2006.01)
  G06F 15/173   (2006.01)
  G06Q 30/00   (2006.01)
(52) U.S. Cl. .............. 709/207; 709/238; 705/26
(58) Field of Classification Search ........... 709/205, 709/200, 223, 224; 370/352; 379/88.17, 379/142.01
  See application file for complete search history.

(56) References Cited

U.S. PATENT DOCUMENTS

| 5,774,534 | A | * | 6/1998 | Mayer ............... 379/142.01 |
| 5,835,061 | A | * | 11/1998 | Stewart ............... 342/457 |
| 6,181,781 | B1 | * | 1/2001 | Porter et al. ........... 379/88.17 |
| 6,285,991 | B1 | * | 9/2001 | Powar ............... 705/76 |
| 6,324,531 | B1 | * | 11/2001 | Anderson et al. ......... 706/15 |
| 6,526,275 | B1 | * | 2/2003 | Calvert ................ 455/418 |
| 6,564,258 | B1 | * | 5/2003 | Uniacke ............... 709/223 |
| 6,571,279 | B1 | * | 5/2003 | Herz et al. ............ 709/217 |
| 6,633,911 | B1 | * | 10/2003 | Matsuzaki et al. ......... 709/224 |
| 6,694,352 | B1 | * | 2/2004 | Omoigui ............... 709/205 |
| 6,711,154 | B1 | * | 3/2004 | O'Neal ............... 370/352 |
| 6,816,878 | B1 | * | 11/2004 | Zimmers et al. ......... 709/200 |

FOREIGN PATENT DOCUMENTS

GB   WO97/37499   * 10/1997

OTHER PUBLICATIONS

U.S. Appl. No. 09/802,133, filed Mar. 9, 2001, pending.
U.S. Appl. No. 09/801,802, filed Mar. 9, 2001, pending.
U.S. Appl. No. 09/803,898, filed Mar. 13, 2001, pending.
U.S. Appl. No. 09/820,852, filed Mar. 30, 2001, pending.
U.S. Appl. No. 09/854,475, filed May 15, 2001, pending.

* cited by examiner

Primary Examiner—Kenny Lin
(74) Attorney, Agent, or Firm—Oblon, Spivak, McClelland, Maier & Neustadt, P.C.

(57) ABSTRACT

Disclosed is an information-presenting apparatus includes a first holding means for holding a first information transmission destination and a second information transmission destination; a second holding means for holding a criterion for selecting either the first information transmission destination or the second information transmission destination; a selection means for selecting either the first information transmission destination or the second information transmission destination on the basis of the criterion held in the second holding means; and a transmission control means for controlling transmission of information to either the first information transmission destination or the second information transmission destination selected by the selection means.

4 Claims, 22 Drawing Sheets

FIG. 8

USER-INFORMATION CATALOG

[USER ID] 11111

[PASSWORD] ****

[PURCHASING-INTENTION-INFORMATION CATALOG]

| | COMMODITY NAME |
|---|---|
| ✓ | ARTIST A'S NEW SONGS |
| | MAIL SOFTWARE 1 |
| | GAME 1 |
| ✓ | PC 1 |
| | LIQUID-CRYSTAL SCREEN 1 |
| ⋮ | ⋮ |

[FAVORITE-INFORMATION CATALOG]

| | CATEGORY 1 | EVALUATION VALUE | | CATEGORY 2 | EVALUATION VALUE |
|---|---|---|---|---|---|
| ✓ | SOFTWARE | 5 | ✓ | GAME | 5 |
| | | | | FOR BUSINESSES | |
| | | | ✓ | FOR CHILDREN | 2 |
| | HARDWARE | | ✓ | DISK | 3 |
| | | | | LIQUID CRYSTAL | |
| ⋮ | ⋮ | ⋮ | | ⋮ | ⋮ |

[NOTIFICATION-METHOD CATALOG]

| | NOTIFICATION METHOD | NOTIFICATION DESTINATION |
|---|---|---|
| 1 | MAIL | 11111@monet.ne.jp |
| 2 | FAX | 03 1111 1111 |
| 3 | SHORT MESSAGE | 090 1111 ???? |
| ⋮ | ⋮ | ⋮ |

[NOTIFICATION-METHOD-SELECTED-CRITERION CATALOG]

| | SELECTED-CRITERION | DETAIL SETTING | | | | | |
|---|---|---|---|---|---|---|---|
| ✓ | EACH HOUR | 1 | 09:00-18:00 | 2 | 18:00-08:00 | 3 | OTHER |
| | EACH DATA QUANTITY | 1 | 100KB | 2 | 100KB | 3 | OTHER |
| | RETRY ORDER | 1 | 1 | 2 | 2 | 3 | 3 |
| | ⋮ | | | | | | |

[POSITIONAL-INFORMATION CATALOG]

| | | |
|---|---|---|
| ✓ | FIXED | 12-3 O-KU, TOKYO |
| | PERIODICAL TRANSMISSION | |

F I G. 9

| USER ID | COMMODITY ID 1 | COMMODITY ID 2 | CATEGORY 1 ||||| CATEGORY 2 ||||| NOTIFICA- TION MOTHOD 1 | NOTIFICA- TION MOTHOD 2 | POSITIONAL INFORMATION |
|---|---|---|---|---|---|---|---|---|---|---|---|---|---|---|
| | | | CLASSIFICA- TION 1 | EVALUA- TION 1 | CLASSIFICA- TION 2 | EVALUA- TION 2 | | CLASSIFICA- TION 1 | EVALUA- TION 1 | CLASSIFICA- TION 2 | EVALUA- TION 2 | | | |
| 11111 | AAAAA | DDDDD | 01 | 5 | | | | 002 | 5 | 006 | 2 | MAIL | FAX | LATITUDE & LONGITUDE 1 |
| 22222 | BBBBB | | 02 | 5 | 01 | 5 | | 054 | 5 | 003 | 5 | MAIL | SMS | LATITUDE & LONGITUDE 2 |
| 33333 | CCCCC | DDDDD | 01 | 5 | 02 | 3 | | 032 | 4 | 076 | 3 | SMS | WWW | LATITUDE & LONGITUDE 3 |
| 44444 | EEEEE | FFFFF | 03 | 3 | 04 | 1 | | 054 | 3 | | | MAIL | MAIL | LATITUDE & LONGITUDE 4 |
| ... | ... | ... | ... | ... | ... | ... | | ... | ... | ... | ... | ... | ... | ... |

FIG.10

USER ID 11111

| | NOTIFICATION METHOD 1 | NOTIFICATION METHOD 2 |
|---|---|---|
| CONNECTION PARTNER | 1111@monet.ne.jp | FAX |
| | | 03-1111-1111 |
| NOTIFICATION-METHOD SELECTION CRITERION ON | | |
| OFF | | |
| DATA AMOUNT OFF | 0-100K Byte | 100K Byte~ |
| TIME | 9:00~18:00 | |
| RETRY ORDER | 1 | 2 |
| DATA CLASSIFICATION OFF | B (NO PICTURE) | A (WITH PICTURE) |

| CATEGOLY / USER | MOVIE (01) | MUSIC (02) | SPORTS (03) | ... |
|---|---|---|---|---|
| USER A | 5 | 0 | 0 | ... |
| USER B | 5 | 5 | 0 | |
| USER C | 5 | 3 | 3 | |
| ⋮ | ⋮ | ⋮ | ⋮ | |

F I G. 13
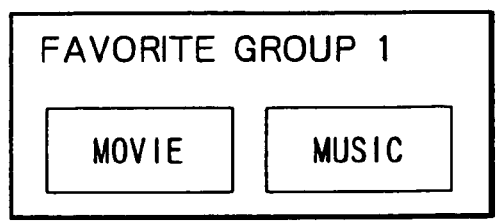
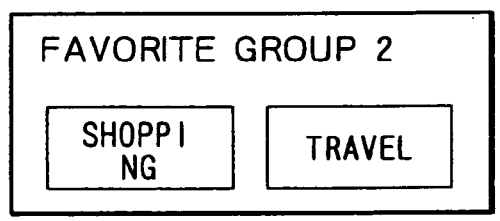
F I G. 14
|  | CATEGORY 1 | CATEGORY 2 |
|---|---|---|
| FAVORITE GROUP 1 | 01 | 02 |
| FAVORITE GROUP 2 | 03 | 05 |
| ⋮ | ⋮ | ⋮ |

FIG. 15

COMMODITY-INFORMATION CATALOG

[COMMODITY ID]    A A A A A

[PASSWORD]    * * * *

[COMMODITY NAME]    GAME 1

[FAVORITE-INFORMATION CATALOG]

|   | CATEGORY 1 |   | CATEGORY 2 |
|---|---|---|---|
| ✓ | SOFTWARE | ✓ | GAME |
|   |   |   | FOR BUSINESSES |
|   |   |   | FOR CHILDREN |
|   | HARDWARE |   | DISK |
|   |   |   | LIQUID CRYSTAL |
|   | ⋮ |   |   |

[NOTICE-INFORMATION CATALOG]

<POSITION PART 1>    LATITUDE    35.00.00.00~36.00.00.00
                      LONGITUDE   135.30.00.00~138.30.00.00

<FOR MAILS>

GAME 1, A CONTINUATION OF GAME 0, IS ON SALES! MAKE AN ACCESS OR VISIT OUR STORE NOW!!

http://www.game1.co.jp/yoyaku.html

MAP

<FOR SHORT MESSAGES>

GAME 1, A CONTINUATION OF GAME 0, IS ON SALES! MAKE AN ACCESS NOW!!

http://www.game1.co.jp/yoyaku.html

· · ·

<POSITION PART 2>    LATITUDE    34.00.00.00~35.00.00.00
                      LONGITUDE   135.30.00.00~138.30.00.00

<FOR MAILS>
· · ·

<FOR SHORT MESSAGES>
· · ·

· · ·

<POSITION PART 3>  · · ·

| COMMODITY ID | NOTICE INFORMATION 1 (FOR MAILS) | NOTICE INFORMATION 2 (FOR FAXS) | NOTICE INFORMATION 3 (FOR SMS') | CATEGORY 1 | CATEGORY 2 |
|---|---|---|---|---|---|
| AAAAA | MAA.txt | FAA.txt | SAA.txt | 01 | 004 |
| BBBBB | MBB.txt | FBB.txt | SBB.txt | 07 | 007 |
| CCCCC | MCC.txt | FCC.txt | SCC.txt | 06 | 043 |
| DDDDD | MDD.txt | FDD.txt | SDD.txt | 02 | 076 |
| ... | ... | ... | ... | ... | ... |

FIG. 17

COMMODITY ID AAAAA

| POSITIONAL INFORMATION | NOTICE INFORMATION 1 (FOR MAILS) | NOTICE INFORMATION 2 (FOR FAXS) | NOTICE INFORMATION 3 (FOR SMS') |
|---|---|---|---|
| POSITIONAL INFORMATION 1 | MAA1.txt | FAA1.txt | SAA1.txt |
| POSITIONAL INFORMATION 2 | MAA2.txt | FAA2.txt | SAA2.txt |
| POSITIONAL INFORMATION 3 | MAA3.txt | FAA3.txt | SAA3.txt |

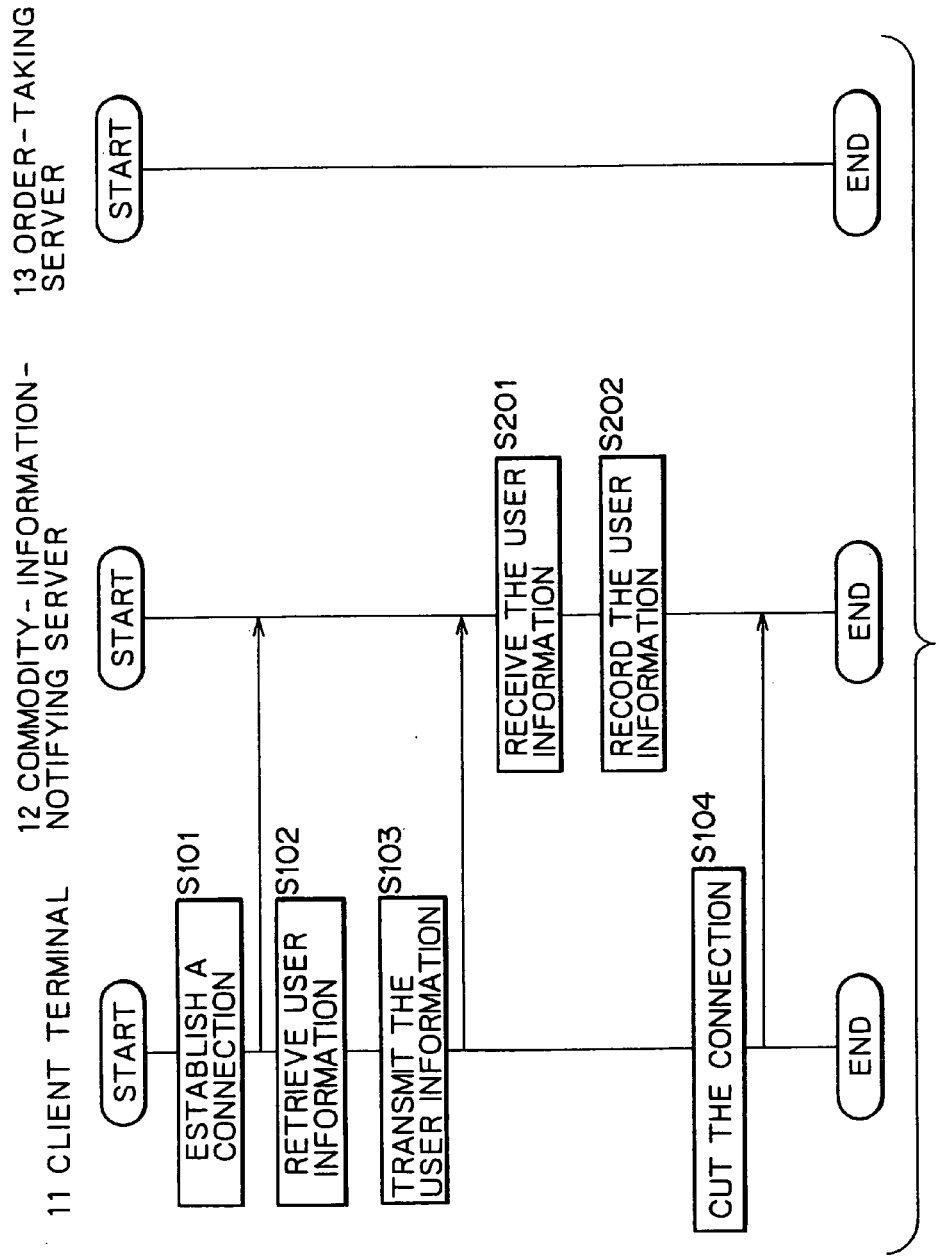

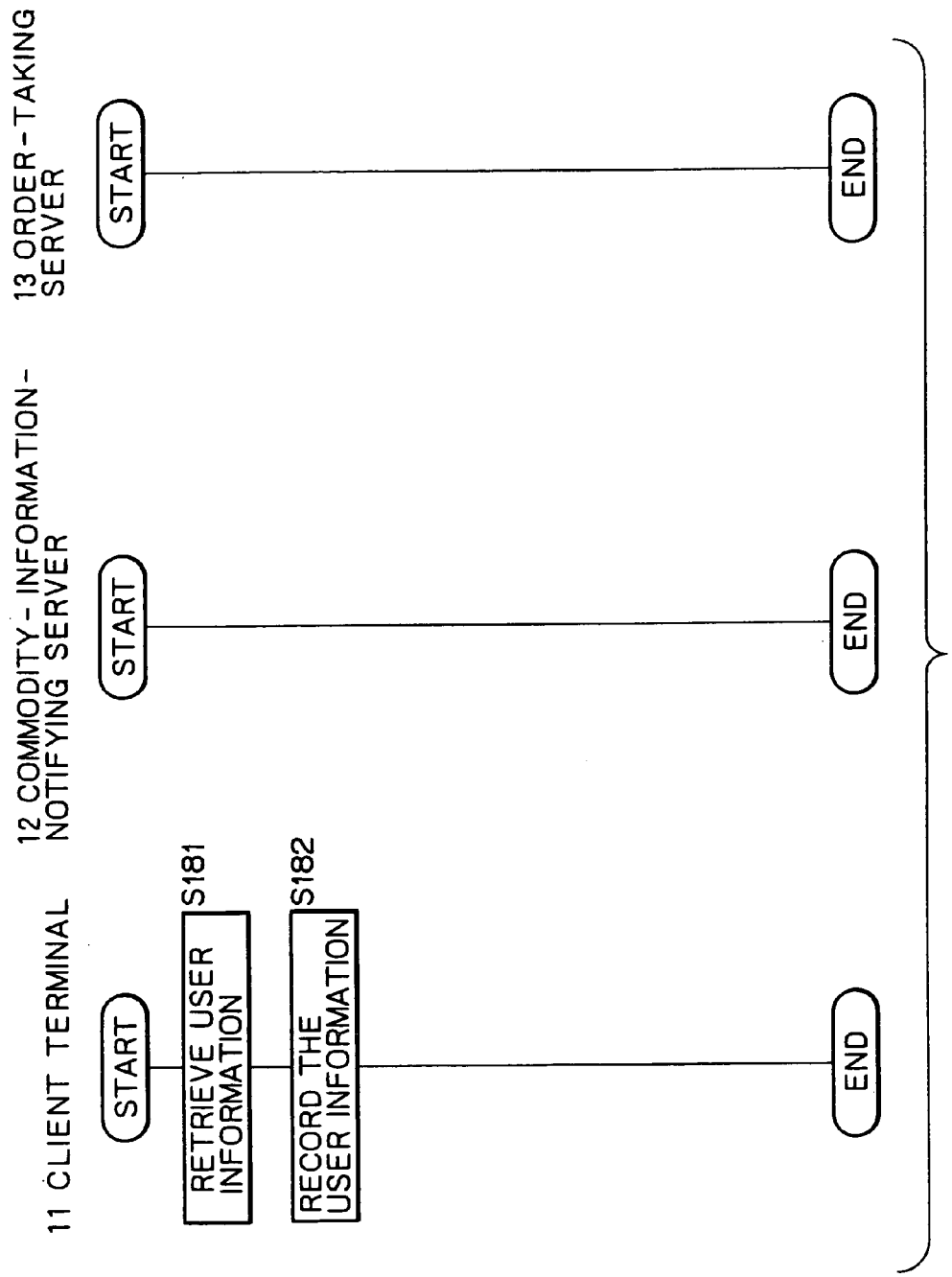

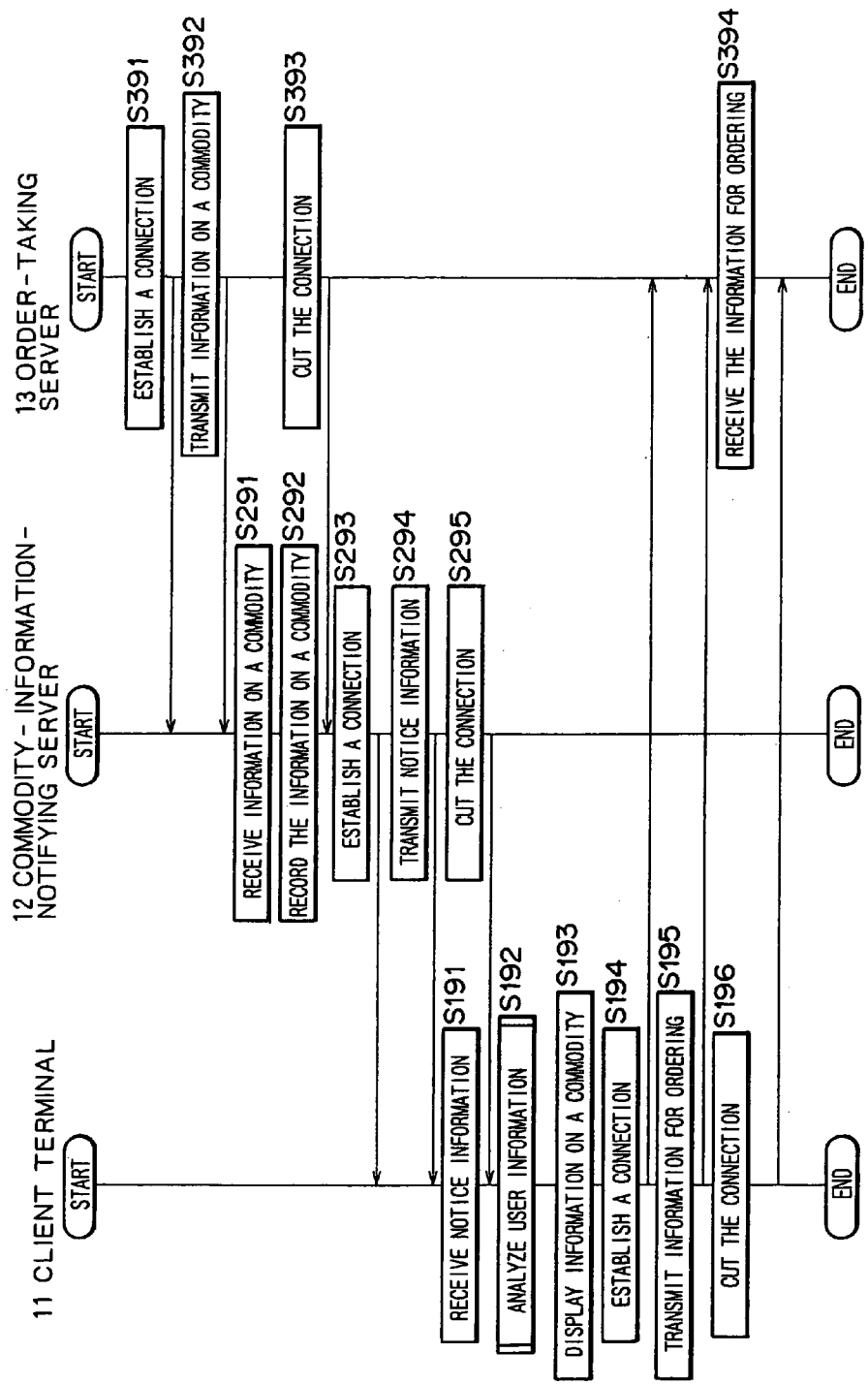

INFORMATION-PRESENTING APPARATUS, INFORMATION-PRESENTING METHOD, INFORMATION-PROCESSING APPARATUS, INFORMATION-PROCESSING METHOD AND PROGRAM-STORING MEDIUM

BACKGROUND OF THE INVENTION

In general, the present invention relates to an information-presenting apparatus, an information-presenting method, an information-processing apparatus, an information-processing method and a program-storing medium. In particular, the present invention relates to an information-presenting apparatus, an information-presenting method, an information-processing apparatus, an information-processing method and a program-storing medium, which are used for transmitting or receiving information on commodities. Even more particularly, the present invention relates to an information-presenting apparatus, an information-presenting method, and a program-storing medium, which are used for presenting information associating with positions of information-processing apparatuses.

FIG. 1 is a diagram showing a typical conventional sales system. As shown in the figure, a client terminal 1 is connected to web servers 3-1 to 3-3 by the Internet 2. The web server 3-1 recognizes, among others, fields of commodities each serving as a favorite with the user of the client terminal 1 on the basis of information on the user. Referred to hereafter as user information, such information is stored in a user-information database 5-1 associated with the web server 3-1.

Receiving a request from the user of the client terminal 1, the web server 3-1 retrieves information on the user from the user-information database 5-1. The web server 3-1 then receives information on a commodity associated with the user information from a commodity-information database 4-1 associated with the web server 3-1. The information on a commodity includes the picture and the price of the commodity. The web server 3-1 then transmits the information on the commodity to the client terminal 1 through the Internet 2.

The web server 3-2 also recognizes, among others, fields of commodities each serving as a favorite with the user of the client terminal 1 on the basis of information on the user. In this case, however, the information on the user is stored in a user-information database 5-2 associated with the web server 3-2.

By the same token, receiving a request from the user of the client terminal 1, the web server 3-2 retrieves information on the user from the user-information database 5-2. The web server 3-2 then receives information on a commodity associated with the user information from a commodity-information database 4-2 associated with the web server 3-2. Likewise, the information on a commodity includes the picture and the price of the commodity. The web server 3-2 then transmits the information on the commodity to the client terminal 1 through the Internet 2.

The web server 3-3 also transmits the information on a commodity to the client terminal 1 through the Internet 2 at a request made by the user of the client terminal 1. Similarly, the information on a commodity includes the picture and the price of the commodity.

The client terminal 1 receives information on commodities from the web server 3-1, 3-2 or 3-3 and displays the information on a display unit not shown in the figure. The user of the client terminal 1 determines a commodity to be purchased from the information on commodities, which includes pictures and prices of the commodities. Then, the user of the client terminal 1 operates the client terminal 1 to transmit information indicating a desire to purchase the determined commodity to one of the web terminals 3-1 to 3-3 through the Internet 2.

Receiving the information indicating a desire to purchase the determined commodity, one of the web terminals 3-1 to 3-3 carries out processes such as accounting and processing to deliver the desired commodity to the user of the client terminal 1.

In the conventional sales system described above, however, the destination of the transmission of information from the web servers 3-1 to 3-3 are limited to the client terminal 1 for one user.

In addition, the web servers 3-1 to 3-3 transmit information on a commodity serving as a favorite with the user of the client terminal 1 as indicated by stored information on the user only to the client terminal 1 and are not capable of transmitting information on other commodities that are most likely of interest to the user.

Moreover, the web servers 3-1 to 3-3 are capable of transmitting only the same information even if the terminal 1 moves to another place.

SUMMARY OF THE INVENTION

It is a first object of the present invention to be capable of selecting desired transmission destination and transmitting information to the selected destination.

It is a second object of the present invention to be capable of letting a number of users most likely interested in a commodity view information on the commodity.

It is a third object of the present invention to be capable of sending information on a commodity according to the current location of the user.

To achieve the above objects, according to a first aspect of the present invention, there is provided an information-presenting apparatus, including: a first holding means for holding a first information transmission destination and a second information transmission destination; a second holding means for holding a criterion for selecting either the first information transmission destination or the second information transmission destination; a selection means for selecting either the first information transmission destination or the second information transmission destination on the basis of the criterion held in the second holding means; and a transmission control means for controlling transmission of information to either the first information transmission destination or the second information transmission destination selected by the selection means.

The first holding means is capable of further holding a first transmission method for the first transmission destination as well as a second transmission method for the second transmission destination, and the transmission control means is capable of controlling transmission of information to transmit the information to the first transmission destination by using the first transmission method in case the first transmission destination is selected or to transmit the information to the second transmission destination by using the second transmission method in case the second transmission destination is selected.

In accordance with the first or second transmission method, the information-presenting apparatus having the above configuration is capable of transmitting information by using one of mail, facsimile and short-message means.

The criterion held by the second holding means is capable of including at least one of a time at which information is transmitted, the amount of transmitted information and the type of the transmitted information.

According to a second aspect of the present invention, there is provided an information-presenting method, including: a first holding step of holding a first information transmission destination and a second information transmission destination; a second holding step of holding a criterion for selecting either the first information transmission destination or the second information transmission destination; a selection step of selecting either the first information transmission destination or the second information transmission destination on the basis of the criterion held at the second holding step; and a transmission control step of controlling transmission of information to either the first information transmission destination or the second information transmission destination selected at the selection step.

According to a third aspect of the present invention, there is provided a program-storing medium used for storing a program, including: a first holding step of holding a first information transmission destination and a second information transmission destination; a second holding step of holding a criterion for selecting either the first information transmission destination or the second information transmission destination; a selection step of selecting either the first information transmission destination or the second information transmission destination on the basis of the criterion held at the second holding step; and a transmission control step of controlling transmission of information to either the first information transmission destination or the second information transmission destination selected at the selection step.

According to a fourth aspect of the present invention, there is provided an information-processing apparatus, including: an input control means for controlling an operation to input transmitted information on a first transmission destination, a second transmission destination and a criterion for selecting either the first transmission destination or the second transmission destination from an information-presenting apparatus; and a transmission control means for controlling transmission of information on the first transmission destination, the second transmission destination and a criterion for selecting either the first transmission destination or the second transmission destination to the information-presenting apparatus.

The input control means further controls an operation to input transmission-method information indicating a first transmission method for the first transmission destination and a second transmission method for the second transmission destination, whereas the transmission control means is capable of controlling transmission of information on transmission methods to the information-presenting apparatus.

According to a fifth aspect of the present invention, there is provided an information-processing method, including: an input control step of controlling an operation to input transmitted information on a first transmission destination, a second transmission destination and a criterion for selecting either the first transmission destination or the second transmission destination from an information-presenting apparatus; and a transmission control step of controlling transmission of information on the first transmission destination, the second transmission destination and a criterion for selecting either the first transmission destination or the second transmission destination to the information-presenting apparatus.

According to a sixth aspect of the present invention, there is provided a program-storing medium used for storing a program, including: an input control step of controlling an operation to input transmitted information on a first transmission destination, a second transmission destination and a criterion for selecting either the first transmission destination or the second transmission destination from an information-presenting apparatus; and a transmission control step of controlling transmission of information on the first transmission destination, the second transmission destination and a criterion for selecting either the first transmission destination or the second transmission destination to the information-presenting apparatus.

According to a seventh aspect of the present invention, there is provided an information-presenting apparatus, including: a holding means for holding first favorite-commodity information indicating the degree of favoritism for commodities of a fist category and second favorite-commodity information indicating the degree of favoritism for commodities of a second category; a computation means for computing favoritism-probability information showing a probability of a first-category product's serving as a favorite with a user fond of products of the second category on the basis of the first favorite-commodity information and the second favorite-commodity information; a recording means for recording the first category by associating the first category with the favoritism-probability information calculated by the computation means with respect to the second category; a selection means which is used for selecting a user fond of products of the second category on the basis of the second favorite-commodity information held in the holding means in transmission of information on a products of the first category in case the first category associated with the favoritism-probability information calculated with respect to the second category is recorded in the recording means; and a transmission control means for controlling transmission of information on commodities of the first category to an information-processing apparatus used by a user selected by the selection means.

The information-presenting apparatus can be further provided with a reception control means for controlling reception of the first favorite-commodity information and the second favorite-commodity information.

According to a eighth aspect of the present invention, there is provided an information-presenting method, including: a holding step of holding first favorite-commodity information indicating the degree of favoritism for commodities of a fist category and second favorite-commodity information indicating the degree of favoritism for commodities of a second category; a computation step of computing favoritism-probability information showing a probability of a first-category product's serving as a favorite with a user fond of products of the second category on the basis of the first favorite-commodity information and the second favorite-commodity information; a recording step of recording the first category by associating the first category with the favoritism-probability information calculated at the computation step with respect to the second category; a selection step which is executed for selecting a user fond of products of the second category on the basis of the second favorite-commodity information held at the holding step in transmission of information on a products of the first category in case the first category associated with the favoritism-probability information calculated with respect to the second category is recorded at the recording step; and a transmission control step of controlling transmission of information on commodities of the first category so as to transmit the information on commodities of the first category to an information-processing apparatus used by a user selected at the selection step.

According to a ninth aspect of the present invention, there is provided a program-storing medium used for storing a program, including: a holding step of holding first favorite-commodity information indicating the degree of favoritism for commodities of a fist category and second favorite-commodity information indicating the degree of favoritism for commodities of a second category; a computation step of computing favoritism-probability information showing a probability of a first-category product's serving as a favorite with a user fond of products of the second category on the basis of the first favorite-commodity information and the second favorite-commodity information; a recording step of recording the first category by associating the first category with the favoritism-probability information calculated at the computation step with respect to the second category; a selection step which is executed for selecting a user fond of products of the second category on the basis of the second favorite-commodity information held at the holding step in transmission of information on a products of the first category in case the first category associated with the favoritism-probability information calculated with respect to the second category is recorded at the recording step; and a transmission control step of controlling transmission of information on commodities of the first category so as to transmit the information on commodities of the first category to an information-processing apparatus used by a user selected at the selection step.

According to a tenth aspect of the present invention, there is provided an information-presenting apparatus, including: a first holding means for holding positional information indicating the present position of an information-processing apparatus; a second holding means for holding pieces of information by associating the pieces of information with sub-areas of a movement range of the information-processing apparatus; a selection means for selecting one of the pieces of information associated with one of the sub-ranges including the information-processing apparatus' present position indicated by the positional information; and a transmission control apparatus for controlling transmission of the selected piece of information to the information-processing apparatus.

According to an eleventh aspect of the present invention, there is provided an information-presenting method, including: holding positional information indicating the present position of an information-processing apparatus; holding pieces of information by associating the pieces of information with sub-areas of a movement range of the information-processing apparatus; selecting one of the pieces of information associated with one of the sub-ranges including the information-processing apparatus' present position indicated by the positional information; and controlling transmission of the selected piece of information to the information-processing apparatus.

According to a twelfth aspect of the present invention, there is provided a program-storing medium used for storing a program, including: holding positional information indicating the present position of an information-processing apparatus; holding pieces of information by associating the pieces of information with sub-areas of a movement range of the information-processing apparatus; selecting one of the pieces of information associated with one of the sub-ranges including the information-processing apparatus' present position indicated by the positional information; and controlling transmission of the selected piece of information to the information-processing apparatus.

BRIEF DESCRIPTION OF THE DRAWINGS

FIG. 8 is a diagram showing a typical screen used by the user of the client terminal 11 for entering information on the user and used for displaying the entered information;

FIG. 9 is a diagram showing a typical structure of a user-information database 21;

FIG. 10 is a diagram showing detailed information on methods of notification for a user identified by a user ID of 11111.

FIG. 13 is an explanatory diagram showing favoritism groups;

FIG. 14 is diagram showing a table of favoritism groups stored in the user-information database 21;

FIG. 15 is a diagram showing a typical screen displayed on a display unit of an order-taking server 13;

FIG. 16 is a diagram showing a typical configuration of a notice-information database 22;

FIG. 17 is a diagram showing pieces of typical notice information stored in the notice-information database 22 for a commodity ID, each being associated with information on a position;

FIG. 18 shows a flowchart representing processing carried out by the commodity-information-notifying server 2 to store information on a user into the user-information database 21;

FIG. 26 shows a flowchart representing processing carried out by the client terminal 11 having the configuration shown in FIG. 25; and FIG. 27 shows a flowchart representing processing carried out by the commodity-information-notifying server 12 also to transmit notice information to the client terminal 11.

PREFERRED EMBODIMENTS OF THE INVENTION

Figure 1:
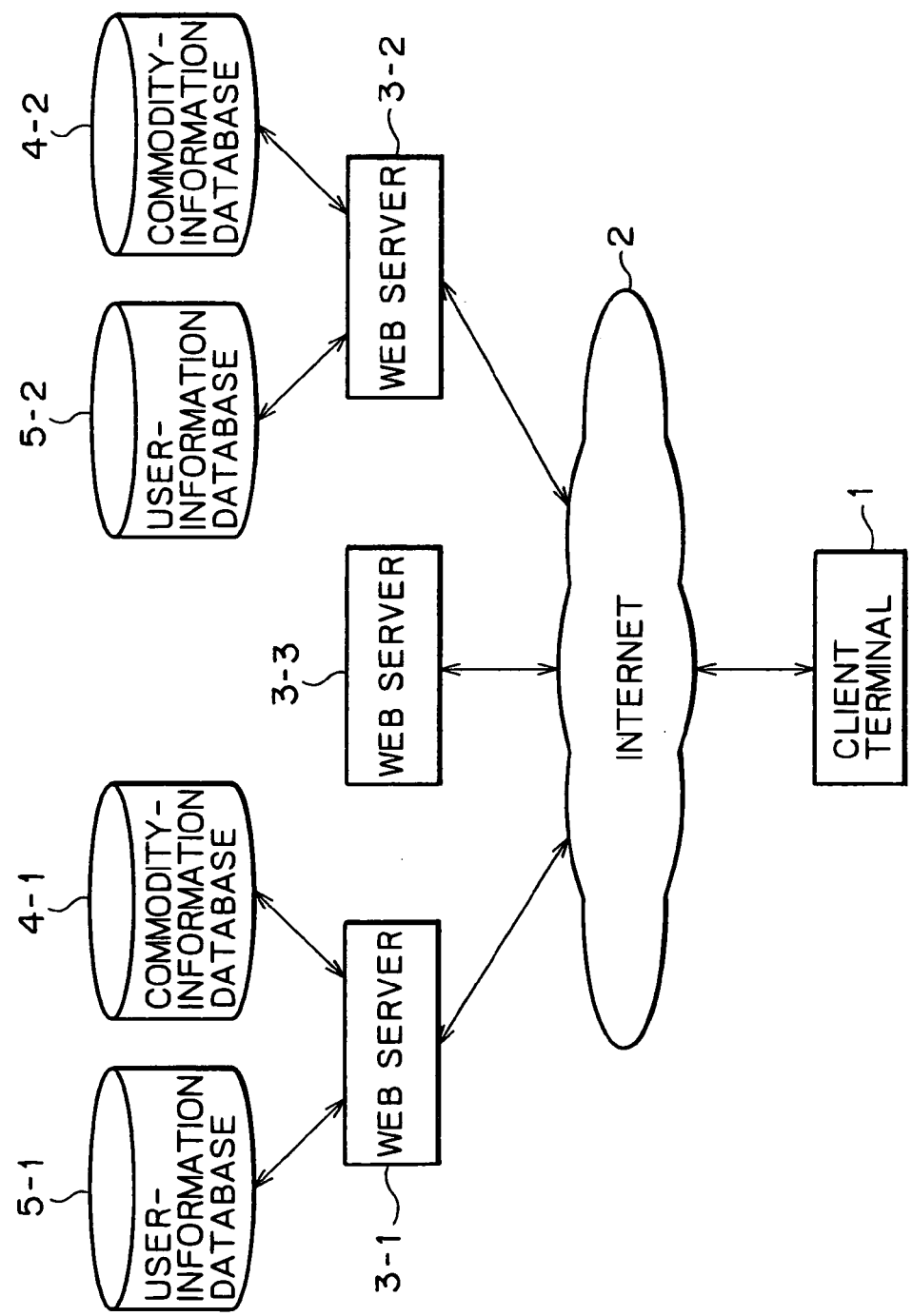
FIG. 1 is a diagram showing a typical conventional sales system.
Figure 2:
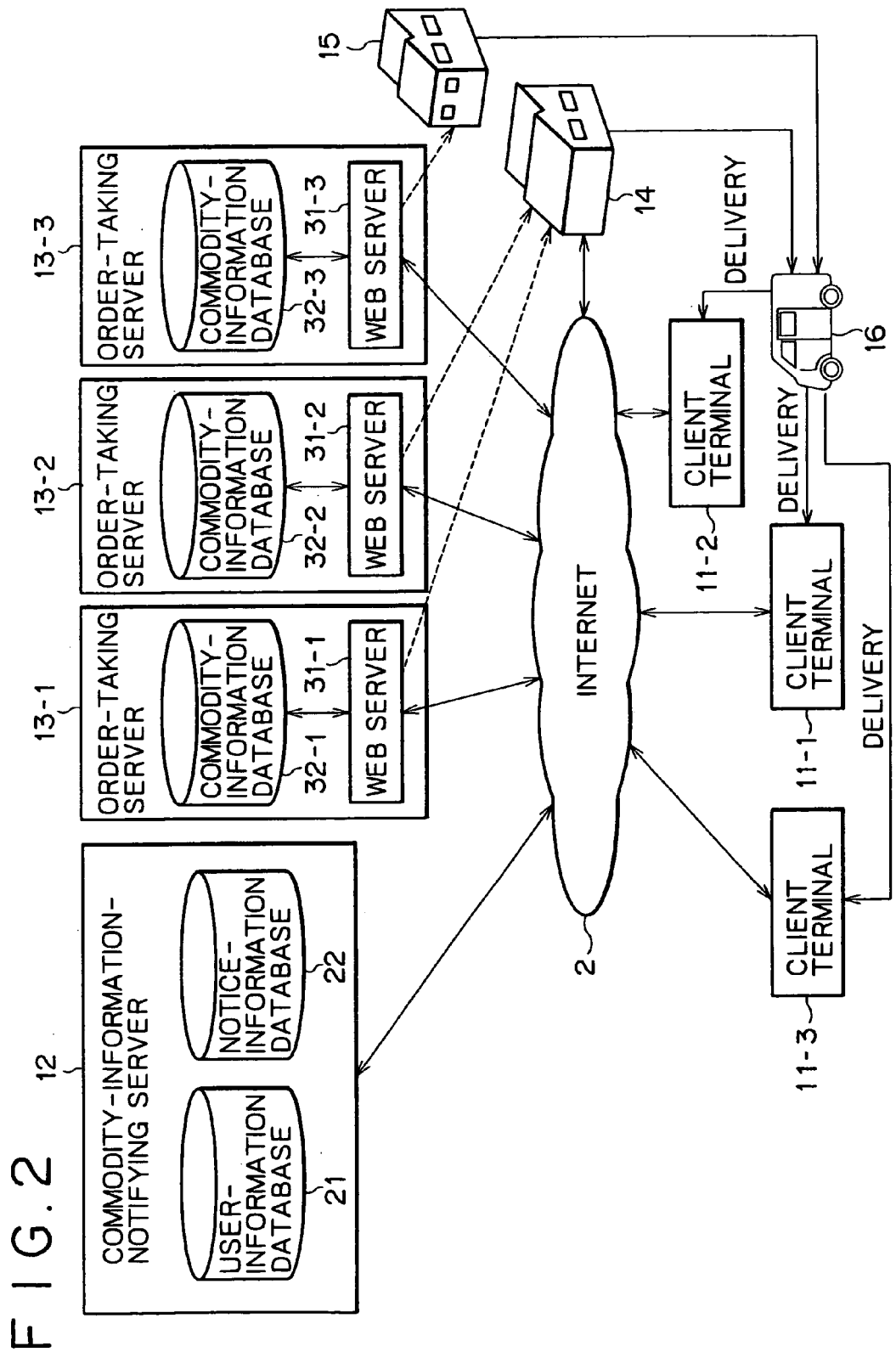
FIG. 2 is a diagram showing the configuration of an embodiment implementing a sales system provided by the present invention.

FIG. 2 is a diagram showing the configuration of an embodiment implementing a sales system provided by the present invention. As shown in the figure, a client terminal 11-1 is connected to a commodity-information-notifying server 12. The client terminal 11-1 transmits information on a user using the client terminal 11-1 to the commodity-information-notifying server 12 through the Internet 2. The client terminal 11-1 also transmits information indicating its own present position periodically to the commodity-information-notifying server 12 through the Internet 2.

By the same token, a client terminal 11-2 is connected to a commodity-information-notifying server 12. The client terminal 11-2 transmits information on a user using the client terminal 11-2 to the commodity-information-notifying server 12 through the Internet 2. The client terminal 11-2 also transmits information indicating its own present position periodically to the commodity-information-notifying server 12 through the Internet 2.

In the same way, a client terminal 11-3 is connected to a commodity-information-notifying server 12. The client terminal 11-3 transmits information on a user using the client terminal 11-3 to the commodity-information-notifying server 12 through the Internet 2. The client terminal 11-3 also transmits information indicating its own present position periodically to the commodity-information-notifying server 12 through the Internet 2.

The commodity-information-notifying server 12 stores the information on a user using the client terminal 11-1 received from the client terminal 11-1 through the Internet 2 in a user-information database 21. By the same token, the commodity-information-notifying server 12 stores the information on a user using the client terminal 11-2 received from the client terminal 11-2 through the Internet 2 in the user-information database 21. In the same way, the commodity-information-notifying server 12 stores the information on a user using the client terminal 11-3 received from the client terminal 11-3 through the Internet 2 in the user-information database 21.

The commodity-information-notifying server 12 stores the information indicating the present position of the client terminal 11-1 and coming from the client terminal 11-1 through the Internet 2 in the user-information database 21. By the same token, the commodity-information-notifying server 12 stores the information indicating the present position of the client terminal 11-2 and coming from the client terminal 11-2 through the Internet 2 in the user-information database 21. In the same way, the commodity-information-notifying server 12 stores the information indicating the present position of the client terminal 11-3 and coming from the client terminal 11-3 through the Internet 2 in the user-information database 21.

An order-taking server 13-1 stores information on commodities on sales in a commodity-information database 32-1 associated with the order-taking server 13-1. The information on commodities on sales is referred to hereafter simply as commodity information. When new commodity information is stored in the commodity-information database 32-1, the order-taking server 13-1 requests a web server 31-1 associated with the order-taking server 13-1 to transmit the new commodity information to the commodity-information-notifying server 12 through the Internet 2.

As an alternative, when new commodity information is stored in the commodity-information database 32-1, a person in charge of the order-taking server 13-1 requests the web server 31-1 to transmit the new commodity information to the commodity-information-notifying server 12 through the Internet 2.

An order-taking server 13-2 stores information on commodities on sales in a commodity-information database 32-2 associated with the order-taking server 13-2. When new commodity information is stored in the commodity-information database 32-2, the order-taking server 13-2 requests a web server 31-2 associated with the order-taking server 13-2 to transmit the new commodity information to the commodity-information-notifying server 12 through the Internet 2.

As an alternative, when new commodity information is stored in the commodity-information database 32-2, a person in charge of the order-taking server 13-2 requests the web server 31-2 to transmit the new commodity information to the commodity-information-notifying server 12 through the Internet 2.

An order-taking server 13-3 stores information on commodities on sales in a commodity-information database 32-3 associated with the order-taking server 13-3. When new commodity information is stored in the commodity-information database 32-3, the order-taking server 13-3 requests a web server 31-3 associated with the order-taking server 13-2 to transmit the new commodity information to the commodity-information-notifying server 12 through the Internet 2.

As an alternative, when new commodity information is stored in the commodity-information database 32-3, a person in charge of the order-taking server 13-3 requests the web server 31-3 to transmit the new commodity information to the commodity-information-notifying server 12 through the Internet 2.

The commodity-information-notifying server 12 stores the commodity information received from the order-taking server 13-1 through the Internet 2 in a notice-information database 22 as notice information to be described later. By the same token, the commodity-information-notifying server 12 stores the commodity information received from the order-taking server 13-2 through the Internet 2 in the notice-information database 22 as notice information. In the same way, the commodity-information-notifying server 12 stores the commodity information received from the order-taking server 13-3 through the Internet 2 in the notice-information database 22 as notice information.

When new notice information is stored in the notice-information database 22, the commodity-information-notifying server 12 selects any of the client terminals 11-1 to 11-3 to which the new notice information is to be transmitted. The commodity-information-notifying server 12 also selects contents of the new notice information to be transmitted on the basis of the new notice information as well as pieces of information on the users of the client terminals 11-1 to 11-3. As described above, the pieces of information on the users are stored in the user-information database 21. Selected contents of notice information may include a text only or both a text and a picture such as a map. In addition, the commodity-information-notifying server 12 also selects notification methods such as notification by mail or facsimile.

The commodity-information-notifying server 12 transmits the selected contents of the new notice information to selected ones of the client terminals 11-1 to 11-3 by using the notification methods selected for the recipients of the contents.

The client terminal 11-1 displays a text, a picture and the like, which are included in the received new notice information, on a display unit to be described later. If the user of the client terminal 11-1 wants to purchase a new commodity with the information thereof appearing on the display unit, the user connects the client terminal 11-1 to one of the order-taking servers 13-1 to 13-3 which offers the commodity through the Internet 2.

By the same token, the client terminal 11-2 displays a text, a picture and the like, which are included in the received new notice information, on a display unit. If the user of the client terminal 11-2 wants to purchase a new commodity with the information thereof appearing on the display unit, the user connects the client terminal 11-2 to one of the order-taking servers 13-1 to 13-3 which offers the commodity through the Internet 2.

In the same way, the client terminal 11-3 displays a text, a picture and the like, which are included in the received new notice information, on a display unit. If the user of the client terminal 11-3 wants to purchase a new commodity with the information thereof appearing on the display unit, the user connects the client terminal 11-3 to one of the order-taking servers 13-1 to 13-3 which offers the commodity through the Internet 2.

The order-taking server 13-1 connected to one of the client terminals 11-1 to 11-3 transmits data such as a form to be filled in by the user of one of the client terminals 11-1 to 11-3 through the Internet 2 in order to purchase the commodity to the connected one of the client terminals 11-1 to 11-3. By the same token, the order-taking server 13-2 connected to one of the client terminals 11-1 to 11-3 transmits data such as a form to be filled in by the user of one of the client terminals 11-1 to 11-3 through the Internet 2 in order to purchase the commodity to the connected one of the client terminals 11-1 to 11-3. In the same way, the order-taking server 13-3 connected to one of the client terminals 11-1 to 11-3 transmits data such as a form to be filled in by the user of one of the client terminals 11-1 to 11-3 through the Internet 2 in order to purchase the commodity to the connected one of the client terminals 11-1 to 11-3.

The user of the client terminal 11-1 fills in the form for purchasing a displayed commodity with information necessary for purchasing the commodity, and operates the client terminal 11-1 to transmit the information necessary for purchasing the commodity to one of the order-taking servers 13-1 to 13-3, which offers the commodity. By the same token, the user of the client terminal 11-2 fills in the form for purchasing a displayed commodity with information necessary for purchasing the commodity, and operates the client terminal 11-2 to transmit the information necessary for purchasing the commodity to one of the order-taking servers 31-1 to 13-3, which offers the commodity. In the same way, the user of the client terminal 11-3 fills in the form for purchasing a displayed commodity with information necessary for purchasing the commodity, and operates the client terminal 11-3 to transmit the information necessary for purchasing the commodity to one of the order-taking servers 13-1 to 13-3, which offers the commodity.

The order-taking server 13-1 receives information necessary for purchasing a commodity from one of the client terminals 11-1 to 11-3 through the Internet 2. The person in charge of the order-taking server 13-1 requests a delivery car 16 to deliver the ordered commodity stored in a warehouse 14 to the user of the client terminal 11-1, 11-2 or 11-3. As an alternative, the person in charge of the order-taking server 13-1 requests the delivery car 16 to get the ordered commodity from a factory 15 and deliver the commodity to the user of the client terminal 11-1, 11-2 or 11-3.

By the same token, the order-taking server 13-2 receives information necessary for purchasing a commodity from one of the client terminals 11-1 to 11-3 through the Internet 2. The person in charge of the order-taking server 13-2 requests the delivery car 16 to deliver the ordered commodity stored in the warehouse 14 to the user of the client terminal 11-1, 11-2 or 11-3. As an alternative, the person in charge of the order-taking server 13-2 requests the delivery car 16 to get the ordered commodity from the factory 15 and deliver the commodity to the user of the client terminal 11-1, 11-2 or 11-3.

In the same way, the order-taking server 13-3 receives information necessary for purchasing a commodity from one of the client terminals 11-1 to 11-3 through the Internet 2. The person in charge of the order-taking server 13-3 requests the delivery car 16 to deliver the ordered commodity stored in the warehouse 14 to the user of the client terminal 11-1, 11-2 or 11-3. As an alternative, the person in charge of the order-taking server 13-3 requests the delivery car 16 to get the ordered commodity from the factory 15 and deliver the commodity to the user of the client terminal 11-1, 11-2 or 11-3.

In the following description, the client terminals 11-1 to 11-3 are denoted by a generic reference numeral 11 unless it is necessary to distinguish one from another.

By the same token, the order-taking servers 13-1 to 13-3 are denoted by a generic reference numeral 13 in the following description unless it is necessary to distinguish one from another. In the same way, the web servers 31-1 to 31-3 are denoted by a generic reference numeral 31 in the following description unless it is necessary to distinguish one from another. Likewise, the commodity-information databases 32-1 to 32-3 are denoted by a generic reference numeral 32 in the following description unless it is necessary to distinguish one from another.

Figure 3:
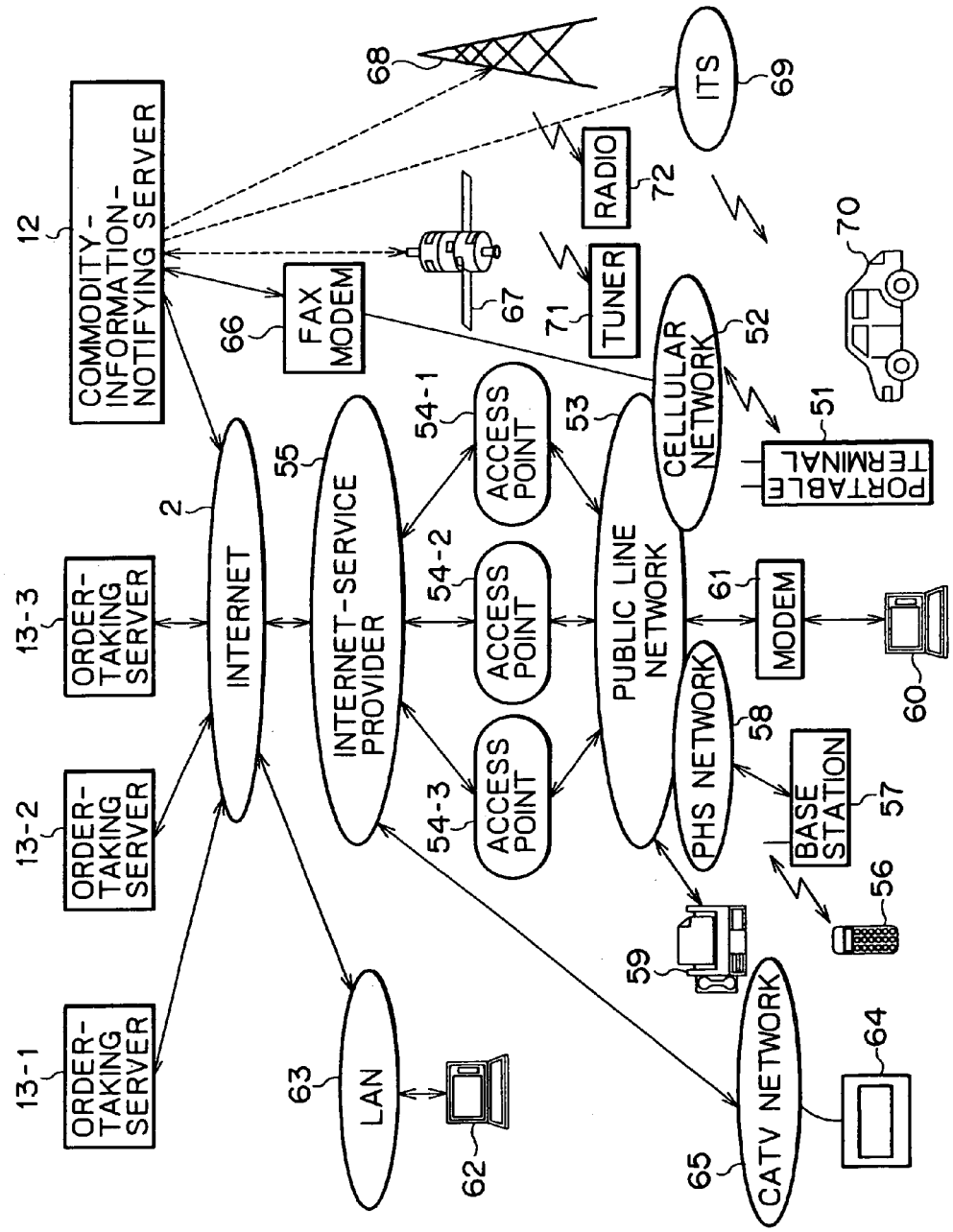
FIG. 3 is a diagram showing a way of transmitting pieces of information in more detail in the sales system provided by the present invention.

FIG. 3 is a diagram showing a way of transmitting pieces of information in more detail in the sales system provided by the present invention. Serving as a typical client terminal 11, a portable terminal 51 is connected to one of the access points 54-1 to 54-3 of an Internet service provider 55 by a cellular network 52 and a public line network 53. The portable terminal 51 is then connected to the Internet service provider 55 through one of the access points 54-1 to 54-3. Subsequently, the portable terminal 51 is connected to the Internet 2 through the Internet service provider 55.

Eventually, the portable terminal 51 is connected to the commodity-information-notifying server 12 or one of the order-taking servers 13-1 to 13-3 through the cellular network 52, the public line network 53, one of the access points 54-1 to 54-3, the Internet service provider 55 and the Internet 2. In this state of connection, the portable terminal 51 transmits data such as information on the user of the portable terminal 51 to the commodity-information-notifying server 12 or data such as an order to one of the order-taking servers 13-1 to 13-3. Also in this state, the portable terminal 51 receives data such as notice information from the commodity-information-notifying server 12 or one of the order-taking servers 13-1 to 13-3.

Serving as another typical client terminal 11, a PHS (Personal Handyphone System) terminal 56 is connected to the commodity-information-notifying server 12 or one of the order-taking servers 13-1 to 13-3 through a base station 57, a PHS network 58, the public line network 53, one of the access points 54-1 to 54-3, the Internet service provider 55 and the Internet 2. In this state of connection, the PHS terminal 56 transmits data such as information on the user of the PHS terminal 56 to the commodity-information-notifying server 12 or data such as an order to one of the order-taking servers 13-1 to 13-3. Also in this state, the portable terminal 51 receives data such as notice information from the commodity-information-notifying server 12 or one of the order-taking servers 13-1 to 13-3.

The commodity-information-notifying server 12 informs a facsimile apparatus 59 of information on a commodity by requesting a fax modem 66 to transmit notice information in typically a TIFF (Tag Image File Format) for the information on a commodity to the fax apparatus 59 through the public line network 53. The fax apparatus 59 receives the notice information transmitted by the fax modem 66 through the public line network 53.

Serving as another typical client terminal 11, a laptop computer 60 requests a modem 61 to transmit predetermined data to the commodity-information-notifying server 12 or one of the order-taking servers 13-1 to 13-3 through the public line network 53, one of the access points 54-1 to 54-3, the Internet service provider 55 and the Internet 2. The predetermined data includes information on the user of the laptop computer 60. In this state of connection, the laptop computer 60 also receives information from the commodity-information-notifying server 12 or one of the order-taking servers 13-1 to 13-3.

Serving as another typical client terminal 11, a laptop computer 62 is connected to the commodity-information-notifying server 12 or one of the order-taking servers 13-1 to 13-3 through a LAN (Local Area Network) 63 and the Internet 2.

Serving as another typical client terminal 11, a CATV (Cable Television) client terminal 64 is connected to the commodity-information-notifying server 12 or one of the order-taking servers 13-1 to 13-3 through a CATV network 65, the Internet service provider 55 and the Internet 2.

Serving as another typical client terminal 11, a navigation apparatus mounted on an a car 70 but not shown in the figure receives notice information on a predetermined commodity from the commodity-information-notifying server 12 through an ITS (Intelligent Transport System) 69.

The commodity-information-notifying server 12 transmits notice information on a predetermined commodity to a tuner 71 serving as a typical client terminal 11 by way of an artificial satellite 67 functioning as a communication satellite or a broadcasting satellite.

The commodity-information-notifying server 12 transmits notice information on a predetermined commodity to a digital radio 72 serving as a typical client terminal 11 by way of a digital radio broadcasting station 68.

The commodity-information-notifying server 12 transmits notice information to a destination selected among the portable terminal 51, the PHS terminal 56, the fax apparatus 59, the laptop computer 60, the other laptop computer 62, the CATV client terminal 64, the navigation apparatus mounted on the car 70 but not shown in the figure, the tuner 71 and the digital radio 72. The commodity-information-notifying server 12 transmits notice information to the portable terminal 51, the PHS terminal 56, the fax apparatus 59, the laptop computer 60, the other laptop computer 62, the CATV client terminal 64, the navigation apparatus mounted on the car 70 but not shown in the figure, the tuner 71 and the digital radio 72, which is selected as a recipient of the notice information by using a transmission system provided for the recipient.

Figure 4:
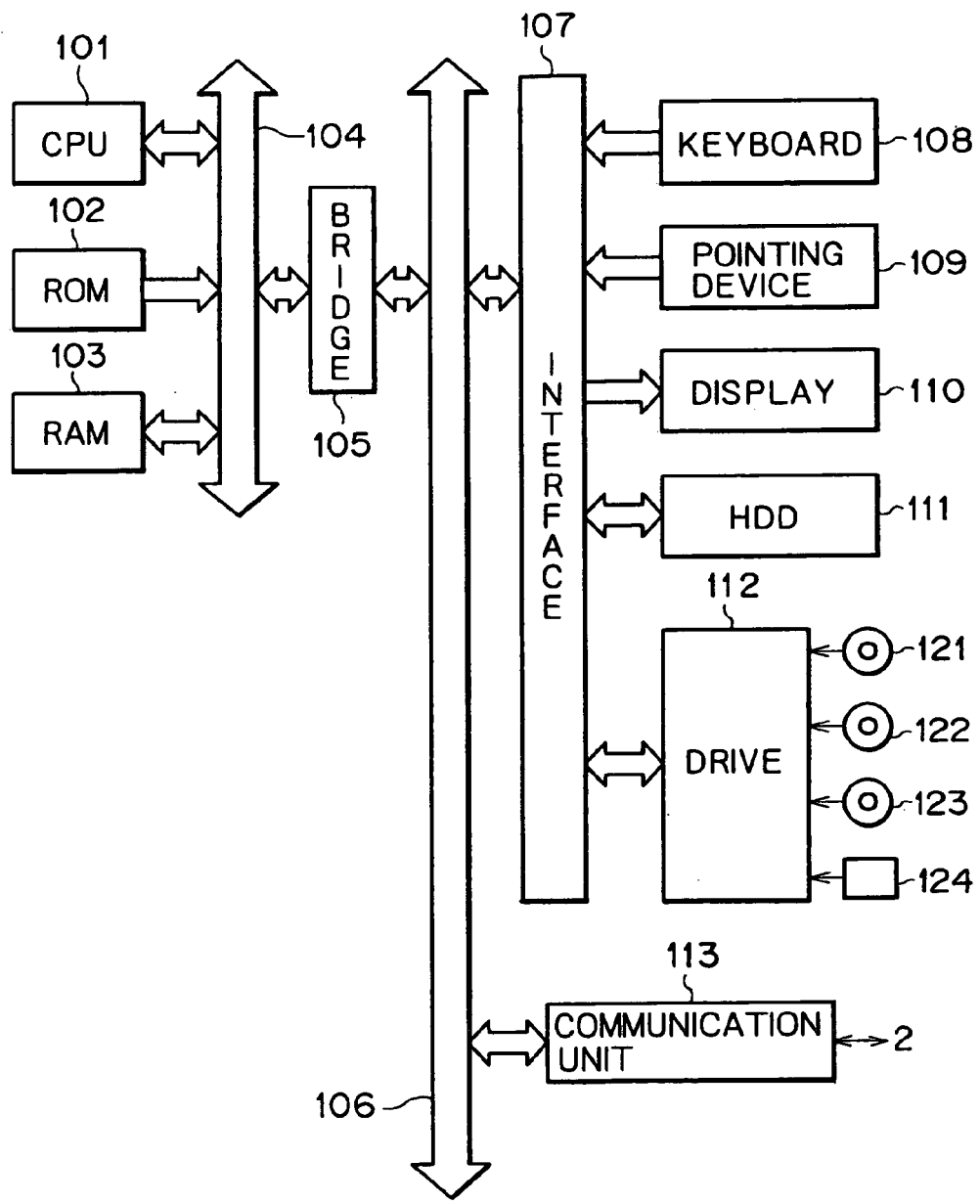
FIG. 4 is an explanatory diagram showing the configuration of a commodity-information-notifying server 12.

FIG. 4 is an explanatory diagram showing the configuration of the commodity-information-notifying server 12. A CPU (Central Processing Unit) 101 actually executes a variety of application programs each implementing a user-information-analyzing function to be described later and executes an OS (Operating System). Basically, a program executed by the CPU 101 and fixed data of parameters used in processing are stored in a ROM (Read-Only Memory) 102. A RAM (Random Access Memory) 103 is used for storing a program being executed by the CPU 101 and storing parameters properly changed during the execution of the program. The CPU 101 is connected to the RAM 103 by a host bus 104 implemented by a CPU bus or the like.

The host bus 104 is connected to an external bus 106 by typically a PCI (Peripheral Component Interconnect/Interface).

A user of the commodity-information-notifying server 12 operates a keyboard 108 to enter a variety of commands to the CPU 101. The user operates a pointing device 109 to specify or select a point on the screen of a display unit 110. Used for displaying various kinds of information as a text and/or an image, the display unit 110 is implemented by a liquid-crystal display device, a CRT (Cathode Ray Tube) or the like. An HDD (Hard Disk Drive) 111 drives a hard disk to record or play back information or a program executed by the CPU 101.

A drive 112 reads out data or a program from a magnetic disc 121, an optical disk 122, a magneto-optical disk 123 or a semiconductor memory 124 and supplies the data or the program to the RAM 103 by way of an interface unit 107, the external bus 106, a bridge 105 and the host bus 104.

The peripherals, from the keyboard 108 to the drive 112, are connected to the interface unit 107 which is connected to the CPU 101 by the external bus 106, the bridge 105 and the host bus 104.

Connected to the Internet 2, a communication unit 113 outputs data received from the CPU 101 or the HDD 111 for transmission by putting the data in packets each conforming to a predetermined system. An example of transmitted data is the notice information described earlier. The communication unit 113 also receives data included in a packet from the Internet 2 and supplies the data to the CPU 101, the RAM 103 or the HDD 111. An example of received data is information on a user.

The communication unit 113 is connected to the CPU 101 by the external bus 106, the bridge 105 and the host bus 104.

Figure 5:
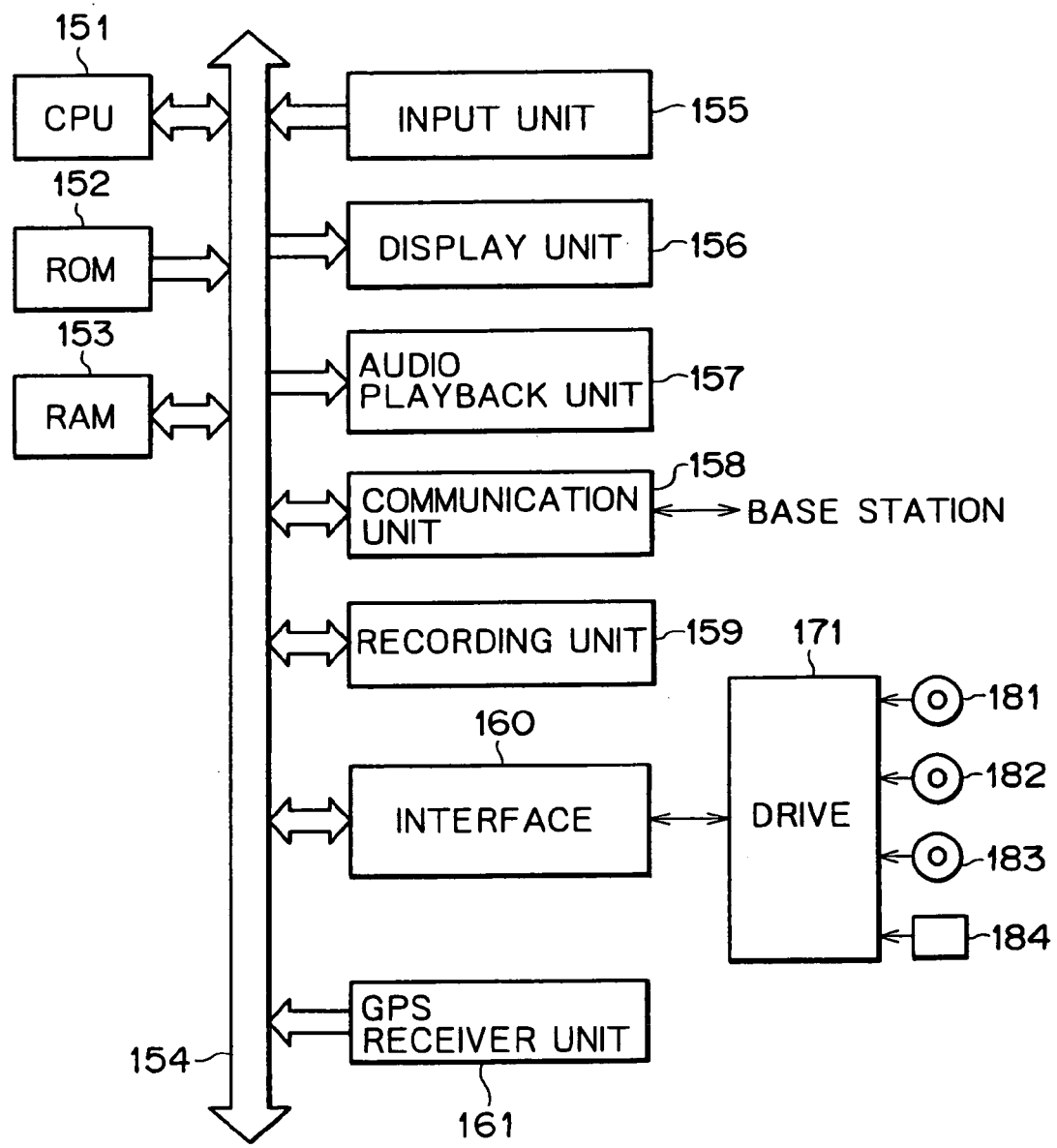
FIG. 5 is an explanatory diagram showing the configuration of a client terminal 11.

FIG. 5 is an explanatory diagram showing the configuration of the client terminal 11 functioning as the portable terminal 51. A CPU 151 executes a variety of programs stored in a ROM 152 and a RAM 153. The ROM 152 is an EEPROM (Electrically Erasable Programmable Read-Only Memory), a flash memory or the like. In general, the ROM 152 is used for storing programs to be executed by the CPU 151 and data representing processing parameters basically fixed throughout program execution. On the other hand, the RAM 153 is an SRAM (Static RAM) used for storing a program being executed by the CPU 151 and data representing processing parameters changed appropriately in the course of program execution.

An input unit 155 is input keys, a microphone or the like. A user of the portable terminal 51 operates the input unit 155 in order to enter a variety of commands or a voice to the CPU 151. A display unit 156 is typically a liquid-crystal display device for displaying various kinds of information as a text, an image and/or the like.

An audio playback unit 157 outputs data representing voices received from a conversation partner by way of a communication unit 158 or audio data played back from a recording unit 159.

The communication unit 158 outputs data received from the CPU 151 or the user's voice received from the input unit 155 to the cellular network 52 or the public line network 53 for transmission by putting the data or audio data representing the voice in packets each conforming to a predetermined system. An example of the data received from the CPU 151 is information on the user of the portable terminal 51. The communication unit 158 also receives data included in a packet from the cellular network 52 or the public line network 53, and supplies the data to the CPU 151, the RAM 153 or the audio playback unit 157. An example of the received data is notice information described earlier.

The recording unit 159 receives data such as a voice, a picture or the like from an interface unit 160 or the communication unit 158 and records the data. The communication unit 158 also outputs recorded data representing a voice to the audio playback unit 157 and data of a picture to the display unit 156.

An interface unit 160 is connected to an external drive 171 for reading out data or a program from a magnetic disc 181, an optical disk 182, a magneto-optical disk 183 or a semiconductor memory 184 and supplying the data or the program to the ROM 152 or the RAM 153 by way of an interface unit 160 and a bus 154.

A GPS (Global Positioning System) receiver system 161 includes an antenna for receiving navigation-message data from a group of GPS satellites. The GPS receiver system 161 extracts a C/A (Clear/Access) code and the like from the navigation-message data, supplying them to the CPU 151 through the bus 154.

The components ranging from the CPU 151 to the GPS receiver system 161 are connected to each other by the bus 154.

Figure 6:
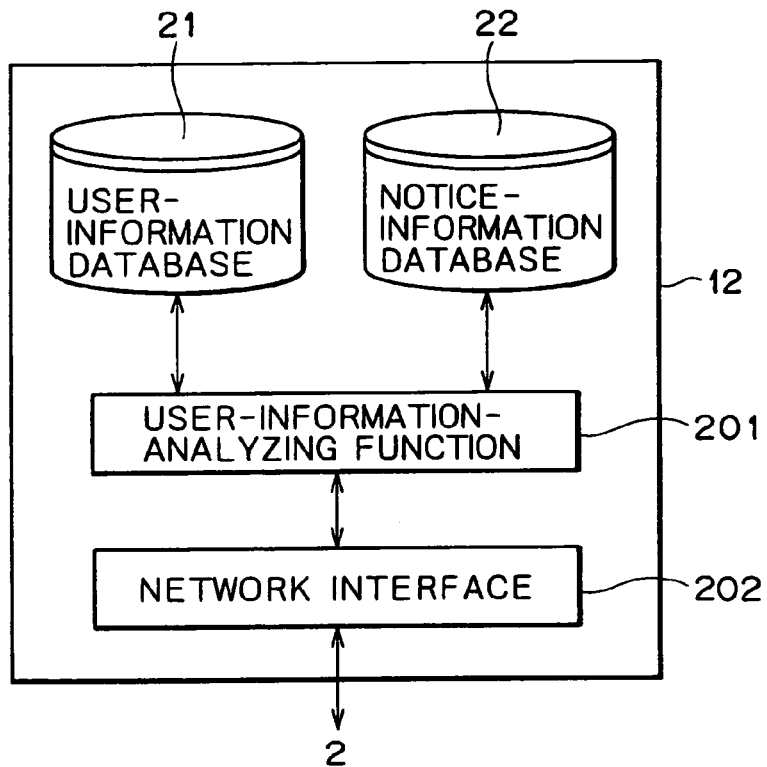
FIG. 6 is an explanatory diagram showing a configuration of functions of the commodity-information-notifying server 12.

FIG. 6 is an explanatory diagram showing a configuration of functions of the commodity-information-notifying server 12 which are each implemented by execution of a predetermined program. The user-information database 21 of the commodity-information-notifying server 12 is used for cataloging information on users of the client terminals 11. The information is received from the client terminal 11 by way of a network interface unit 202. Typically, the client terminal 11 transmits the information periodically to the commodity-information-notifying server 12 by way of the network-interface 202 to be cataloged in the user-information database 21.

The notice-information database 22 is used for cataloging commodity information received from any of the order-taking servers 13-1 to 13-3 by way of the network-interface 202 as notice information.

A user-information-analyzing function 201 selects the user of a client terminal 11 to receive notice information on the basis of information on users, which is stored in the user-information database 21, and notice information cataloged in the notice-information database 22. In addition, the user-information-analyzing function 201 also selects a notification method of presenting information to the client terminal 11 to receive notice information on the basis of information on users, which is stored in the user-information database 21, and notice information cataloged in the notice-information database 22. Notification methods of presenting information to the client terminal 11 include mail, fax and short-message methods.

The user-information-analyzing function 201 also selects contents of notice information to be transmitted to a client terminal 11 on the basis of data such as information on the present position of the client terminal 11 and notice information cataloged in the notice-information database 22. The data is also stored in the user-information database 21. The contents of notice information can be a text, a picture or the like.

The commodity-information-notifying server 12 transmits the notice information with the selected contents by using the selected notification method of presenting information to the client terminal 11 of the selected user by way of the network-interface 202.

Figure 7:
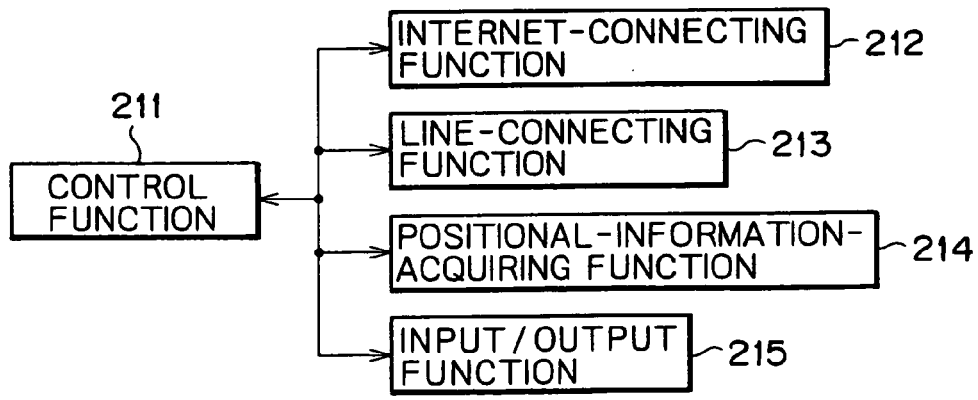
FIG. 7 is an explanatory diagram showing a configuration of functions of a client terminal 11.

FIG. 7 is an explanatory diagram showing a configuration of functions of the client terminal 11 which are each implemented by execution of a predetermined program. A control function 211 controls the entire client terminal 11. To be more specific, the control function 211 controls an Internet-connecting function 212, a line-connecting function 213, a positional-information-acquiring function 214 and an input/output function 215.

The Internet-connecting function 212 is a function which includes procedures such as an IP (Internet Protocol), driving the communication unit 158 to establish a connection with the Internet 2.

The line-connecting function 213 is a function which drives the communication unit 158 to establish a connection with any of the access points 54-1 to 54-3 through typically the cellular network 52.

The positional-information-acquiring function 214 is a function which finds latitude and longitude of the position of its own client terminal 11 on the basis of typically a C/A code received from the GPS receiver system 161.

The input/output function 215 is a function which acquires an input from the input unit 155 and supplies the input to the control function 211. The input/output function 215 also displays notice information acquired from the Internet-connecting function 212 on the display unit 156.

FIG. 8 is a diagram showing a typical screen used by the user of the client terminal 11 for entering information on the user and used for displaying the entered information on the display unit 156 under control executed by the input/output function 215 in transmitting the information from the client terminal 11 to the commodity-information-notifying server 12. The screen is referred to hereafter as a user-information-cataloging screen. The client terminal 11 may obtain data for displaying the user-information-cataloging screen from the recording unit 159 or receive the data from the commodity-information-notifying server 12 through the Internet 2.

The user-information-cataloging screen includes fields for entering a user ID and a password, a field for cataloging an intention to purchase a commodity, a field for cataloging information on a favorite commodity, a field for cataloging a method of notification, a field for cataloging a selected criterion each for a method of notification and a field for cataloging information on the present position of the client terminal 11.

A user ID entered to the field for entering a user ID is used for identifying the user of the client terminal 11. A password entered to the field for entering a password is used for forming a judgment as to whether or not the user of the client terminal 11 is an authorized user.

The field for cataloging an intention to purchase commodities displays the names of predetermined commodities in advance. The user of the client terminal 11 selects commodities to be purchased by checking the field's position for the name of each of the commodities. In the typical screen shown in FIG. 8, desiring to purchase a new song of Artist A and personal computer 1, the user of the client terminal 11 checks positions on the left side of the new song of Artist A and personal computer 1.

The field for cataloging information on favorite commodity information displays categories of a commodity and a position for entering an evaluation value for each of the categories. The user of the client terminal 11 checks the field's position for the category of interest and enters an evaluation value for the category of interest to indicate the degree of the interest in the category of commodity.

The user of the client terminal 11 is allowed to enter evaluation values of five different ratings. A rating value of 5 indicates the highest degree of interest in the category of commodity. On the other hand, a rating value of 1 represents interest in the category of commodity to a certain degree, that is, indicates that the user is interested least in the category.

As shown in the figure, the field for cataloging information on a favorite commodity displays columns of categories 1 and 2. The column of category 1 displays a list of major categories while the column of category 2 is a list of sub-categories for each of the major categories. For example, software category on the column of category 1 is a major category. On the other hand, game and business categories on the column of category 2 are each a sub-category in the software major category.

Having most interest in software shown on the column of category 1, the user of the client terminal 11 checks a position on the left side of the software category and enters an evaluation value of 5 on the right side thereof in the field for cataloging information on a favorite commodity shown in FIG. 8.

Having most interest in the software major category's game sub-category shown on the column of category 2, the user of the client terminal 11 checks a position on the left side of the game sub-category and enters an evaluation value of 5 on the right side thereof in the field for cataloging information on a favorite commodity sown in FIG. 8. Having some interest in the software major category's for-children sub-category shown on the column of category 2, on the other hand, the user of the client terminal 11 checks a position on the left side of the for-children sub-category and enters an evaluation value of 2 on the right side thereof.

Having some interest in the hardware major category's disc sub-category shown on the column of category 1, the user of the client terminal 11 checks a position on the left side of the disc sub-category and enters an evaluation value of 3 on the right side in the field for cataloging information on a favorite commodity shown in FIG. 8.

In the field for cataloging a method of notification, a notification address is set for each notification method to inform the user of notice information. In the example shown in FIG. 8, notice information transmitted by using the mail method is destined for a mail address of 11111@monet-.ne.jp. On the other hand, notice information transmitted by using fax or the short-message method is destined for a fax number of 03-1111-1111 or a telephone number of 090-1111-???? respectively.

The field for cataloging criteria each selected for a notification method allows the user to specify a criterion selected for a notification method used for informing the user of notice information. For example, an each-hour criterion or an each-notice-information-amount criterion may be selected. A retry-order criterion may also be specified.

In the example shown in FIG. 8, an each-our criterion is specified by checking a position on the left side thereof. In this case, notice information is transmitted by using the mail method during the period 9:00 to 18:00 and by fax during the period 18:00 to 8:00. In other periods of time, notice information is transmitted by the short-message method.

The field for cataloging information on the present position of the client terminal 11 indicates whether the position of the client terminal 11 should be regarded as a fixed or variable position. In the latter case, information on the present position of the client terminal 11 is transmitted to the commodity-information-notifying server 12 periodically.

In the example shown in FIG. 8, the fixed position is specified to indicate that the position of the client terminal 11 should be regarded as a fixed position. In this case, the postal address of the user is recorded on the right side of the fixed-position item and will be stored in the user-information database 21 as positional information to be described later. This information on the position is not updated.

The client terminal 11 transmits pieces of information set in the field for cataloging an intention to purchase a commodity, the field for cataloging information on a favorite commodity, the field for cataloging a method of notification, the field for cataloging a criterion selected for each of the methods of notification and the field for cataloging information on a position to the commodity-information-notifying server 12 as information on the user.

FIG. 9 is a diagram showing a typical structure of the user-information database 21 used for cataloging pieces of information including a commodity ID for each user ID identifying a user. The commodity ID identifies a commodity that the user desires to purchase. The other pieces of information include category 1 of commodities in which the user has interest as well as the evaluation value of category 1, category 2 representing a sub-category of category 1 as well as an evaluation value of category 2, a method of informing the user of notice information and positional information indicating the present position of the client terminal 11. As described earlier, an evaluation value is an indicator representing the degree of interest which the user has in category 1 or category 2.

In the example shown in FIG. 9, the user-information database 21 includes information revealing that the user using the client terminal 11-1 and having a user ID of 11111 desires to purchase commodities identified by commodity IDs of AAAAA and DDDDD.

In addition, the information stored in the user-information database 21 also reveals that the user using the client terminal 11-1 and having a user ID of 11111 is most interested in software products as indicated by an evaluation value of 5 set in category 01 of category 1. Category 01 of category 1 is a software category. Furthermore, the information stored in the user-information database 21 also reveals that the user is also most interested in game products as indicated by an evaluation value of 5 set in category 002 of category 2. Category 002 of category 2 is a game sub-category of the software category. Moreover, the information stored in the user-information database 21 also reveals that the user is somewhat interested in children-oriented products as indicated by an evaluation value of 2 set in category 006 of category 2. Category 006 of category 2 is a children-oriented sub-category of the software category.

In addition, the information stored in the user-information database 21 also reveals that the user using the client terminal 11-1 and having a user ID of 11111 selects mails and facsimiles as means for transmitting notice information to the user.

Furthermore, the information stored in the user-information database 21 also includes latitude and longitude which represent the present position of the user using the client terminal 11-1 and having a user ID of 11111. This positional information is received periodically from the client terminal 11-1.

In the same way, in the example shown in FIG. 9, the user-information database 21 includes information revealing that the user using the client terminal 11-2 and having a user ID of 22222 desires to purchase a commodity identified by a commodity ID of BBBBB. In addition, the information also reveals that the user using the client terminal 11-2 and having a user ID of 22222 is most interested in products pertaining to categories 01 and 02 of category 1 as indicated by an evaluation value of 5 set therein. Furthermore, the information also reveals that the user is also is also most interested in products pertaining to sub-categories 054 and 003 of category 2 as indicated by an evaluation value of 5 set therein.

In addition, the information also reveals that the user using the client terminal 11-2 and having a user ID of 22222 selects mails and short messages as means for transmitting notice information to the user. Furthermore, the information also includes latitude and longitude which represent the present position of the user using the client terminal 11-2 and having a user ID of 22222.

By the same token, in the example shown in FIG. 9, the user-information database 21 includes information on users using the client terminals 11-3 and 11-4 and having user IDs of 33333 and 44444 respectively.

As described above, the user-information database 21 includes a piece of information on a user for each user ID.

The user-information database 21 also includes a piece of detailed information on methods of notification for each user ID. FIG. 10 is a diagram showing detailed information on methods of notification for a user identified by a user ID of 11111.

A first method of notification for a user identified by a user ID of 11111 is notification by mail. The user-information database 21 includes a mail address of 11111@monet.ne.jp as a connection destination of the notification by mail. A second method of notification for the user identified by the same user ID of 11111 is notification by fax. The user-information database 21 includes a fax number of 03-1111-1111 as a connection destination of the notification by fax.

The detailed information stored in the user-information database 21 for the user identified by the user ID of 11111 includes a criterion for selecting the first or second method of notification. The criterion reveals adoption of the first method of notification, that is, the notification by mail, for an amount of information on a commodity not exceeding 100 Kbyte, or adoption of the second method of notification, that is, the notification by fax, for an amount of information on a commodity exceeding 100 Kbyte.

As a criterion for selecting the first or second method of notification, the user can also store a time range or a data type in the user-information database 21. For example, a data type indicates whether or not the information on a commodity includes a picture.

In addition, the user-information database 21 also includes data representing favoritism groups based on relations of commodities each serving as a favorite with a user. The relations are computed by the user-information-analyzing function 201.

The computation carried out by the network-interface 202 to find relations of commodities each a serving as a favorite with a user is explained as follows. First of all, the user-information-analyzing function 201 extracts categories of interest to users and the evaluation values of the categories from the user-information database 21 which includes the categories including category 1 and category 2 as shown in FIG. 9.

Figures 11, 12:
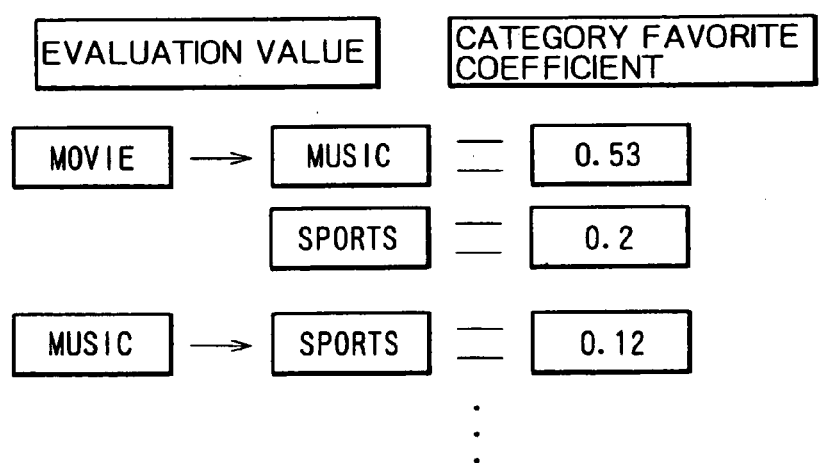
FIG. 11 is a table including evaluation values of categories for each user.
FIG. 12 is an explanatory diagram showing category favoritism coefficients computed from evaluation values of categories.

The user-information-analyzing function 201 then creates a table including evaluation values of categories for each user as shown in FIG. 11. An evaluation value of 0 assigned to a category as shown in FIG. 11 for a user indicates that the user has no interest in the category.

Subsequently, the user-information-analyzing function 201 computes a category favoritism coefficient ab of 2 categories, namely, categories a and b, by using Equation as follows.

Category favoritism coefficient ab=All users Σ ((Evaluation value of category a/Maximum evaluation value of category a)*(Evaluation value of category b/Maximum evaluation value of category b))/Total number of all users  [Equation 1]

wherein the summation is carried out with respect to all users.

Examples of categories a and b are movies and sports respectively.

The category favoritism coefficient ab represents the degree to which a user interested in category a is interested in category b. A large category favoritism coefficient ab indicates that it is quite within the bounds of possibility that a user fond of category a is also interested in category b. On the other hand, a small category favoritism coefficient ab indicates that it is all but out of the bounds of possibility that a user fond of category a is also interested in category b.

Typical values of the category favoritism coefficient ab, which are each computed by the user-information-analyzing function 201 for a pair of categories, are shown in FIG. 12. As shown in FIG. 12, the category favoritism coefficient ab computed by the user-information-analyzing function 201 for the movie category with respect to the music category has a typical value of 0.53 while the category favoritism coefficient ab computed for the movie category with respect to the sport category has a typical value of 0.2. On the other hand, the category favoritism coefficient ab computed by the user-information-analyzing function 201 for the music category with respect to the sport category has a typical value of 0.12.

The user-information-analyzing function 201 puts a pair of categories having a category favoritism coefficient exceeding a predetermined threshold value such as 0.5 in a favoritism group. For example, a first favoritism group consists of the movie and music categories whereas a second favoritism group consists of the shopping and travel categories as shown in FIG. 13.

The user-information-analyzing function 201 supplies data representing favoritism groups found in this way to the user-information database 21. In the user-information database 21, the data which is received from the user-information-analyzing function 201 and represents favoritism groups, is stored as a table shown in FIG. 14. As shown in the figure, the table is a list of favoritism groups each composed of a pair of categories.

In the table shown in FIG. 14, categories composing a pair are each category 1. The user-information database 21 also includes a table containing a list of favoritism groups each composed of a pair of categories 2 even though this table is shown in none of the figures.

It should be noted that the user-information-analyzing function 201 may also compute a correlation coefficient based on evaluation values of categories and then create a favoritism group based on the computed correlation coefficient.

As a result, the commodity-information-notifying server 12 is capable of identifying a category of commodities most likely of interest to a user which is not described in information on the user as a user interested in the commodities.

FIG. 15 is a diagram showing a typical screen displayed on a display unit 110 of the order-taking server 13 and used by a person in charge of the order-taking server 13 for entering new-commodity information to be transmitted to the commodity-information-notifying server 12. This screen is referred to hereafter simply as a commodity-information-cataloging screen.

As shown in the figure, the commodity-information-cataloging screen includes fields for entering a commodity ID and a password, a field for cataloging information on categories and a field for cataloging notice information.

A commodity ID entered to the field for entering a user ID is used for identifying a new commodity. A password entered to the field for entering a password is used for forming a judgment as to whether or not the person in charge of the order-taking server 13 is an authorized person.

The field for entering information on categories displays a list of categories 1 and a list of categories 2 for each of categories 1 The person in charge of the order-taking server 13 checks one of categories 1 to which the commodity identified by the commodity ID pertains as a major category, and selects one of categories 2 as the commodity's sub-category pertaining to checked category 1. For example, a commodity identified by a commodity ID of AAAAA pertains to a game sub-category on a list of categories 2, which pertains to a software major category on the list of categories 1. Thus, the person in charge of the order-taking server 13 checks a position on the left side of the game sub-category and a position on the left side or the software major category.

The field for cataloging notice information is used for setting pieces of notice information for the mail, short-message and fax notification methods for each present position of the client terminal 111.

In the case of a commodity identified by the commodity ID AAAAA, for example, the notice information for the mail notification method and a first present position includes a text, a URL (an mail address) and a map picture. In this example, the first present position is represented by latitude in the range 35.00.00.00 to 36.00.00.00 and longitude in the range 135.30.00.00 to 138.30.00.00. The text typically states: "Game 1, a continuation of game 0, is on sales. Make an access or visit our store now." The URL is http://www.game1.co.jp/yoyaku.html.

By the same token, in the case of the commodity identified by the commodity ID AAAAA, the notice information for the short-message notification method and the first present position includes only a text and a URL (an mail address) but no map picture. Also in this case, the first present position is represented by latitude in the range 35.00.00.00 to 36.00.00.00 and longitude in the range 135.30.00.00 to 138.30.00.00. The text typically also states: "Game 1, a continuation of game 0, is on sales. Make an access now." The URL is also http://www.game1.co.jp/yoyaku.html.

The field for cataloging notice information on the commodity-information-cataloging screen shown in FIG. 15 can also be used for setting notice information for the fax notification method for the first present position represented by a latitude in the range 35.00.00.00 to 36.00.00.00 and a longitude in the range 135.30.00.00 to 138.30.00.00. In addition, the field for cataloging notice information can also be used for setting notice information for the mail method for a second present position represented by a latitude in the range 34.00.00.00 to 35.00.00.00 and a longitude in the range 135.30.00.00 to 138.30.00.00. By the same token, the field for cataloging notice information can also be used for setting notice information for the short-message method for the second present position represented by a latitude in the range 34.00.00.00 to 35.00.00.00 and a longitude in the range 135.30.00.00 to 138.30.00.00. In the same way, the field for cataloging notice information can also be used for setting notice information for the fax method for the second present position represented by a latitude in the range 34.00.00.00 to 35.00.00.00 and a longitude in the range 135.30.00.00 to 138.30.00.00.

As an alternative, the order-taking server 13 may also retrieve information on a predetermined commodity from the commodity-information database 32 employed in the order-taking server 13, and sets the information in the field for cataloging information on categories and the field for cataloging notice information.

The order-taking server 13 then transmits the information entered to the fields for entering a commodity ID and a password, the field for cataloging information on categories and the field for cataloging notice information to the commodity-information-notifying server 12 as information on a commodity. The commodity-information-notifying server 12 stores the commodity information received from the order-taking server 13 in the notice-information database 22 as notice information.

The notice-information database 22 employed in the commodity-information-notifying server 12 can be regarded as a table including notice information for the mail notification method, notice information for the short-message notification method, notice information for the fax notification method, category 1 of a commodity and category 2 of the commodity for each commodity ID identifying the commodity as shown in FIG. 16. The figure is a diagram showing a typical structure of the notice-information database 22.

The first row of the notice-information database 22 shown in FIG. 16 includes notice information for a commodity ID of AAAAA. As shown on the first row, the notice information for a commodity ID of AAAAA comprises notice information MAA.txt for the mail notification method, notice information SAA.txt for the short-message notification method, notice information FAA.txt for the fax notification method as well as category 1 of 01 and category 2 of 004, which are provided for a commodity identified by the commodity ID of AAAAA. The notice information MAA.txt for the mail notification method, the notice information SAA.txt for the short-message notification method and the notice information FAA.txt for the fax notification method are each an advertisement text of the commodity, a descriptive text of the commodity and/or the name of a store selling the commodity.

By the same token, the second row of the notice-information database 22 shown in FIG. 16 includes notice information for a commodity ID of BBBBB. As shown on the second row, the notice information for a commodity ID of BBBBB comprises notice information MBB.txt for the mail notification method, notice information SBB.txt for the short-message notification method, notice information FBB.txt for the fax notification method as well as category 1 of 07 and category 2 of 007, which are provided for a commodity identified by the commodity ID of BBBBB The notice information MBB.txt for the mail notification method, the notice information SBB.txt for the short-message notification method and the notice information FBB.txt for the fax notification method are each an advertisement text of the commodity, a descriptive text of the commodity and/or the name of a store selling the commodity.

The third row of the notice-information database 22 shown in FIG. 16 includes notice information for a commodity ID of CCCCC. As shown on the third row, the notice information for a commodity ID of CCCCC comprises notice information MCC.txt for the mail notification method, notice information SCC.txt for the short-message notification method, notice information FCC.txt for the fax notification method as well as category 1 of 06 and category 2 of 043, which are provided for a commodity identified by the commodity ID of CCCCC. The notice information MCC.txt for the mail notification method, the notice information SCC.txt for the short-message notification method and the notice information FCC.txt for the fax notification method are each an advertisement text of the commodity, a descriptive text of the commodity and/or the name of a store selling the commodity.

The fourth row of the notice-information database 22 shown in FIG. 16 includes notice information for a commodity ID of DDDDD. As shown on the fourth row, the notice information for a commodity ID of DDDDD comprises notice information MDD.txt for the mail notification method, notice information SDD.txt for the short-message notification method, notice information FDD.txt for the fax notification method as well as category 1 of 02 and category 2 of 076, which are provided for a commodity identified by the commodity ID of DDDDD. The notice information MDD.txt for the mail notification method, the notice information SDD.txt for the short-message notification method and the notice information FDD.txt for the fax notification method are each an advertisement text of the commodity, a descriptive text of the commodity and/or the name of a store selling the commodity.

Notice information stored in the notice-information database 22 is not limited to texts but may also include transmissible data such as a picture. In addition, pieces of notice information may be stored in the notice-information database 22 as data conforming to a TIFF system in the case of notice information for the fax notification method, each being associated with an apparatus serving as a transmission destination.

As described above, the notice-information database 22 can be used for storing notice information for each notification method adopted for a commodity and categories of the commodity by associating the notice information and the categories with each commodity ID.

FIG. 17 is a diagram showing pieces of typical notice information stored in the notice-information database 22 for a commodity ID, each being associated with information on a position. To be more specific, the notice-information database 22 shown in FIG. 17 includes pieces of notice information, which are associated with a commodity ID of AAAAA and each comprise notice information for the mail notification method, notice information for the fax notification method and notice information for the short-message notification method.

For example, for the commodity ID of AAAAA, the notice-information database 22 includes notice information associated with positional information 1. The notice information associated with positional information 1 represented by a latitude in the range 35.00.00.00 to 36.00.00.00 and a longitude in the range 135.30.00.00 to 138.30.00.00 comprises typically notice information 1 of MAA1.txt for the mail notification method, notice information 2 of FAA1.txt for the fax notification method and notice information 3 of SAA1.txt for the short-message notification method.

In addition, for the same commodity ID of AAAAA, the notice-information database 22 also includes notice information associated with positional information 2. The notice information associated with positional information 2 represented by a latitude in the range 34.00.00.00 to 35.00.00.00 and a longitude in the range 135.30.00.00 to 138.30.00.00 comprises typically notice information 1 of MAA2.txt for the mail notification method, notice information 2 of FAA2.txt for the fax notification method and notice information 3 of SAA2.txt for the short-message notification method.

As described above, the notice-information database 22 can also be used for storing pieces of notice information by associating each of the pieces of notice information with a position.

The following description explains processing carried out by the commodity-information-notifying server 12 to store information on a user into the user-information database 21 by referring to a flowchart shown in FIG. 18. The flowchart begins with a step S101 at which the control function 211 of the client terminal 11 requests the line-connecting function 213 to drive the communication unit 158 to connect the client terminal 11 to a base station of the cellular network 52. Requested by the control function 211 of the client terminal 11, the Internet-connecting function 212 drives the communication unit 158 to establish a connection with the commodity-information-notifying server 12 through the cellular network 52, the public line network 53, one of the access points 54-1 to 54-3, the Internet service provider 55 and the Internet 2.

At the next step S102, the control function 211 of the client terminal 11 requests the input/output function 215 to receive user information entered by the user of the client terminal 11 by operating the input unit 155. At the next step S103, the control function 211 of the client terminal 11 requests the Internet-connecting function 212 to drive the communication unit 158 to transmit the received information on the user to the commodity-information-notifying server 12 by way of the Internet 2.

At the next step S201, the network-interface 202 employed in the commodity-information-notifying server 12 receives the user information transmitted by the client terminal 11 by way of the Internet 2. At the next step S202, the network-interface 202 stores the user information received in the processing carried out at the step S201 in the user-information database 21 employed in the commodity-information-notifying server 12.

At a step S104, the control function 211 of the client terminal 11 requests the line-connecting function 213 to drive the communication unit 158 to disconnect the client terminal 11 from the base station of the cellular network 52 and terminate the processing.

In this way, the commodity-information-notifying server 12 receives information on a user from the client terminal 11 and stores the information in the user-information database 21. The information on a user includes categories of interest to the user as well as their evaluation values, selected methods of notification and criteria for the selected methods of notification.

Figure 19:
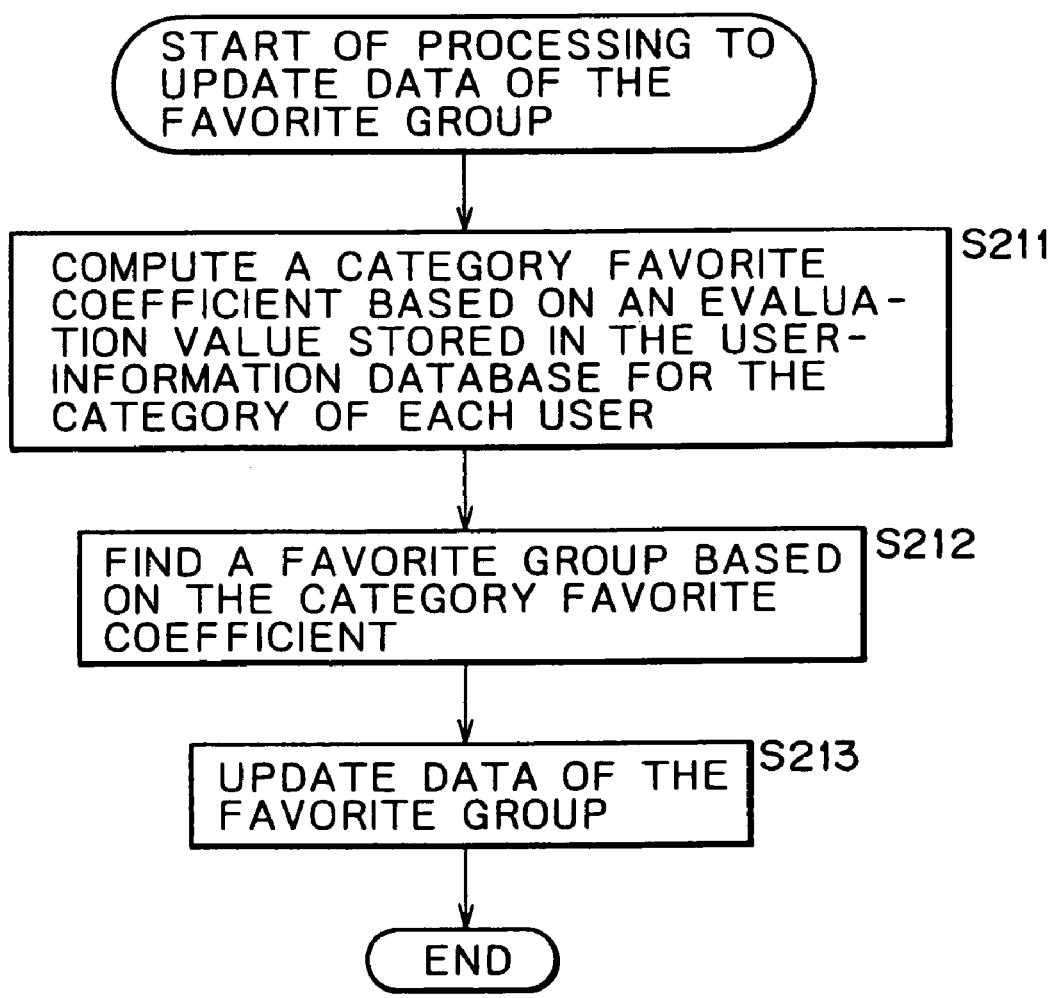
FIG. 19 shows a flowchart representing processing carried out by a user-information-analyzing function 201 of a commodity management server 21 to update data of favoritism groups at intervals determined in advance or at a time determined on a daily basis.

The following description explains processing carried out by the user-information-analyzing function 201 of the commodity-information-notifying server 12 to update data of-favoritism groups at intervals determined in advance or at a time determined on a daily basis by referring to a flowchart shown in FIG. 19.

The flowchart begins with a step S211 at which the user-information-analyzing function 201 of the commodity-information-notifying server 12 retrieves evaluations values of categories associated with a user from the commodity-information-notifying server 12 and computes a category favoritism coefficient for each pair of categories from the evaluation values.

At the next step S212, the user-information-analyzing function 201 compares each category favoritism coefficient with a pre-stored threshold value and puts each pair of categories with a category favoritism coefficient greater than the pre-stored threshold value in a favoritism group.

At the next step S213, the user-information-analyzing function 201 supplies 2 categories pertaining to each favoritism group created in the processing carried out at the step S212 to the user-information database 21 to update data of favoritism groups stored in the user-information database 21 before ending the processing.

In this way, data of favoritism groups stored in the user-information database 21 is updated typically at intervals determined in advance or at a time determined on a daily basis of the commodity-information-notifying server 12 updates data of the favoritism group recorded in the user-information database 21 in accordance with changes in user favorite commodity stored in the user-information database 21.

Figure 20:
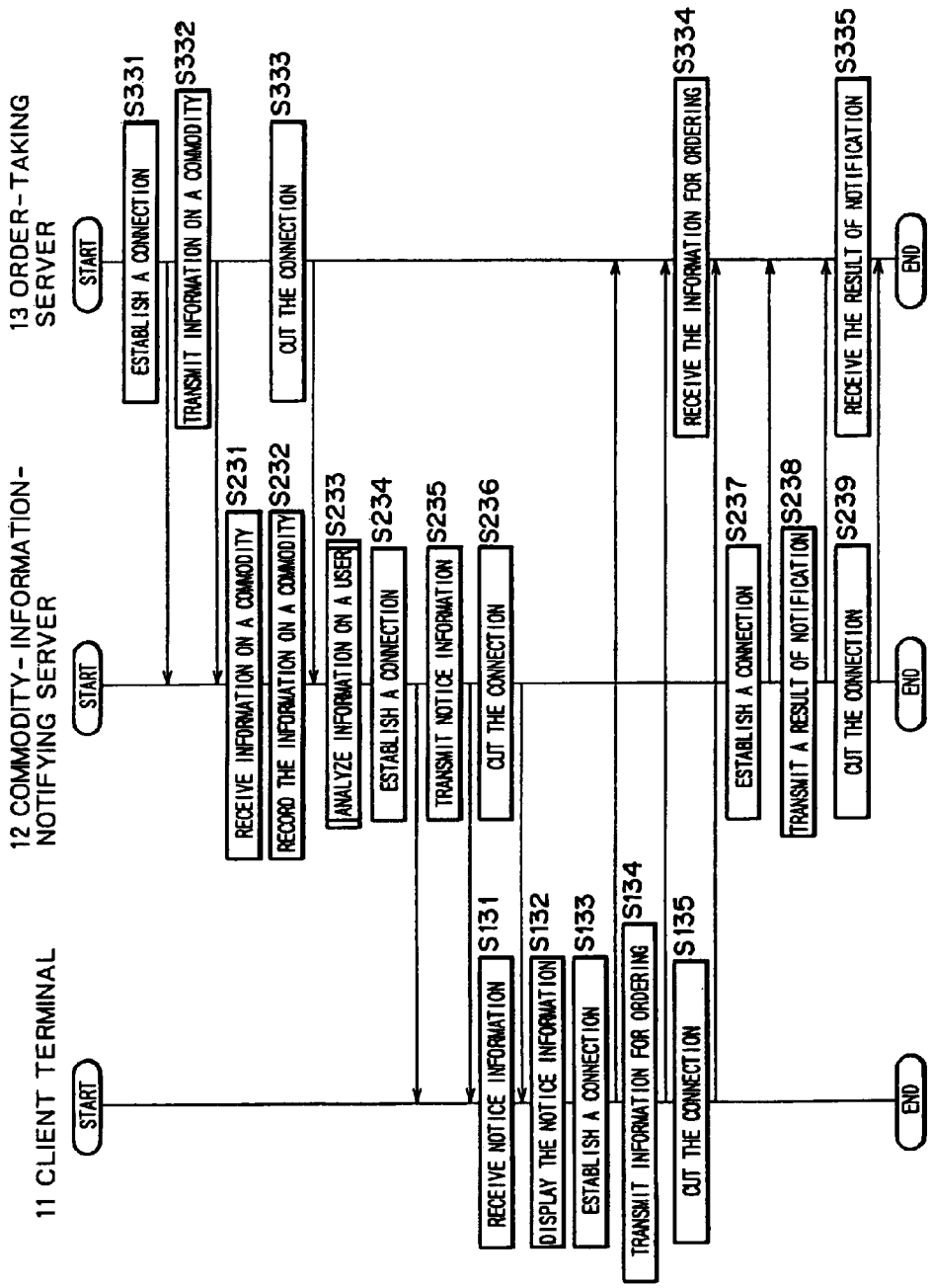
FIG. 20 shows a flowchart representing processing carried out by the commodity-information-notifying server 12 to transmit notice information to the client terminal 11.

The following description explains processing carried out by the commodity-information-notifying server 12 to transmit notice information to the client terminal 11 by referring to a flowchart shown in FIG. 20.

The flowchart begins with a step S331 at which the order-taking server 13 establishes a connection to the commodity-information-notifying server 12. At the next step S332, the order-taking server 13 transmits commodity information input through the commodity-information-cataloging screen explained earlier by referring to FIG. 15 to the commodity-information-notifying server 12 by way of the Internet 2.

At a step S231, the network-interface 202 employed in the commodity-information-notifying server 12 receives the commodity information transmitted by the order-taking server 13 by way of the Internet 2. At the next step S232, the network-interface 202 stores the commodity information received in the processing carried out at the step S231 in the notice-information database 22 employed in the commodity-information-notifying server 12.

At a step S333, the order-taking server 13 cuts the connection with the commodity-information-notifying server 12.

At a step S233, the user-information-analyzing function 201 of the commodity-information-notifying server 12 analyzes information on users. Details of the analysis carried out in the processing carried out at the step S233 will be explained later by referring to flowcharts shown in FIGS. 21 to 23.

At the next step S234, the network-interface 202 employed in the commodity-information-notifying server 12 drives the communication unit 158 to establish a connection with the client terminal 11 through typically the Internet 2 on the basis of information such as an address or a telephone number obtained as a result of the analysis conducted in the processing carried out at the step S233. At a step S235, the network-interface 202 employed in the commodity-information-notifying server 12 retrieves notice information from the notice-information database 22 and transmits the information to the client terminal 11. The commodity-information-notifying server 12 records a transmission destination of the notice information.

At a step S236, the network-interface 202 employed in the commodity-information-notifying server 12 cuts the connection with the client terminal 11. The connection was established in the processing carried out at the step S234.

At a step S131, the control function 211 of the client terminal 11 requests the input/output function 215 to receive notice information transmitted by the commodity-information-notifying server 12 by way of the Internet 2. At the next step S132, the control function 211 of the client terminal 11 displays the received notice information on the display unit 156.

By looking at the notice information displayed on the display unit 156, the user of the client terminal 11 is capable of making a decision as to whether or not to purchase a commodity. In addition, by looking at the notice information displayed on the display unit 156, the user of the client terminal 11 is also capable of searching for more information on the commodity described by the notice information.

If the user of the client terminal 11 makes a decision to purchase a commodity, at the next step S133, the control function 211 of the client terminal 11 requests the line-connecting function 213 to drive the communication unit 158 to establish a connection with a base station of the cellular network 52. The control function 211 of the client terminal 11 requests the internet-connecting function 212 to drive the communication unit 158 to establish a connection with the order-taking server 13 through the cellular network 52, the public line network 53, one of the access points 54-1 to 54-3, the Internet service provider 55 and the Internet 2.

At the next step S134, the control function 211 of the client terminal 11 requests the input/output function 215 to receive information for placing an order. The information is entered by the user by operating the input unit 155. The input/output function 215 then drives the communication unit 158 to transmit the information for placing an order to the order-taking server 13 by way of the Internet 2.

At a step S334, the web server 31 associated with the order-taking server 13 receives the information for placing an order from the client terminal 11. The order-taking server 13 carries out processes for the client terminal 11. The processes include accounting for the user of the client terminal 11 and processing to deliver the ordered commodity to the user.

At a step S135, the control function 211 of the client terminal 11 requests the line-connecting function 213 to drive the communication unit 158 to cut the established connection with a base station of the cellular network 52.

At a step S237, the network-interface 202 employed in the commodity-information-notifying server 12 drives the communication unit 158 to establish a connection with the order-taking server 13 through typically the Internet 2 on the basis of pre-stored information such as an address. At the next step S238, the network-interface 202 employed in the commodity-information-notifying server 12 retrieves a result of notification such as a notification destination to which stored notice information was transmitted, and transmits the result of notification to the order-taking server 13.

At a step S335, the order-taking server 13 receives the result of notification from the commodity-information-notifying server 12.

At a step S239, the network-interface 202 employed in the commodity-information-notifying server 12 cuts the connection established in the processing carried out at the step 237 with the order-taking server 13 prior to termination of the processing.

In this way, when receiving information on a commodity from the order-taking server 13, the commodity-information-notifying server 12 selects a predetermined client terminal 11 and transmits the information to the client terminal 11. The commodity-information-notifying server 12 also transmits a result of notification, that is, the fact that the information on a commodity was transmitted to the client terminal 11, to the order-taking server 13.

With information on the user of a client terminal 11 cataloged in the user-information database 21 employed in the commodity-information-notifying server 12 in advance, the commodity-information-notifying server 12 appropriately informs the user of information on a new commodity through a proper apparatus serving as the client terminal 11, allowing the user to immediately verify a desire for the commodity. To be more specific, with information on the user of a client terminal 11 cataloged in the user-information database 21 employed in the commodity-information-notifying server 12 in advance, the commodity-information-notifying server 12 appropriately informs the user of notice information including a picture through a facsimile apparatus 59 serving as the client terminal 11 or notice information comprising only a short text through a portable terminal 51 serving as the client terminal 11, allowing the user to immediately receive the contents of the notice information by using the predetermined apparatus serving as the client terminal 11.

Figure 21:
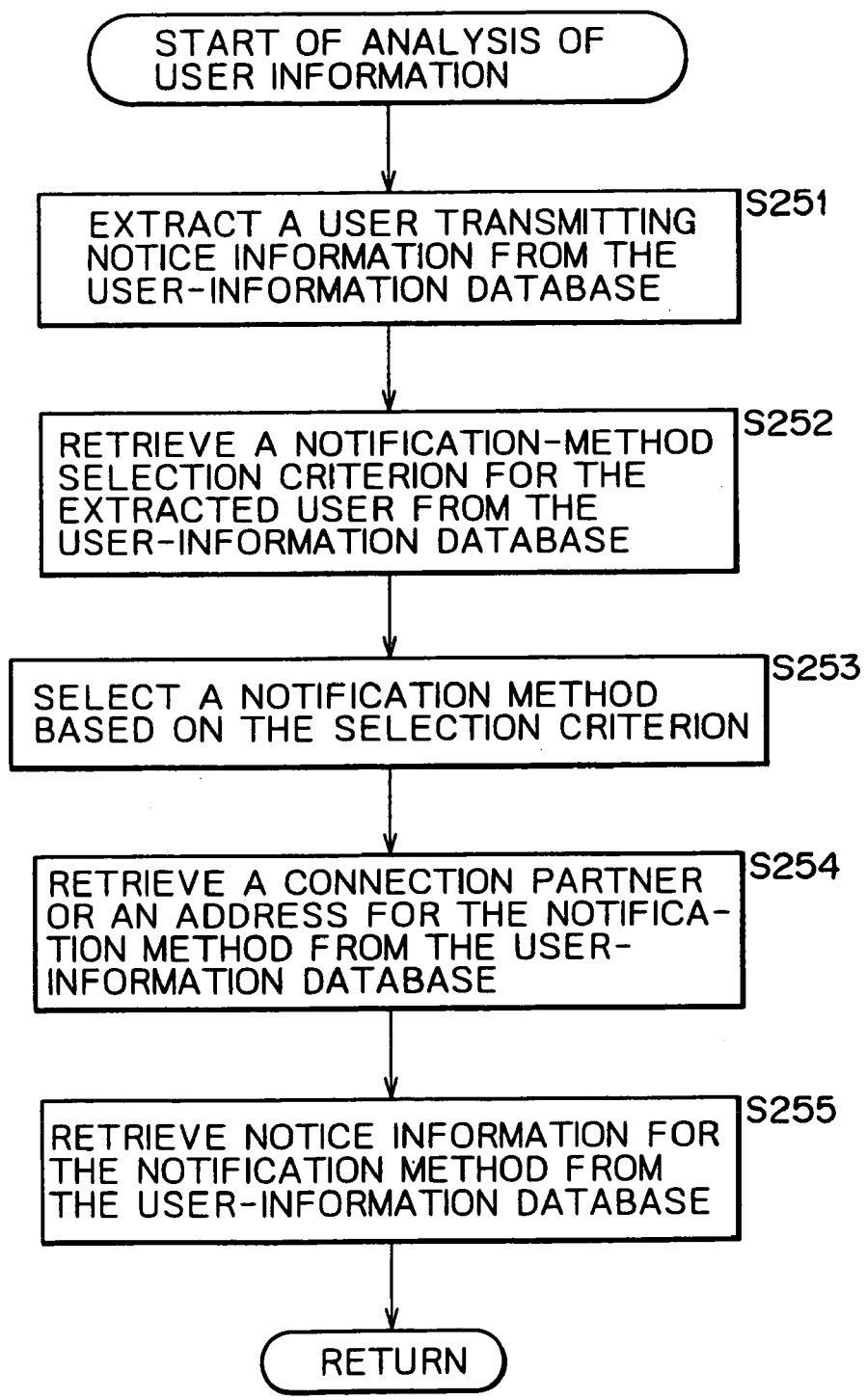
FIG. 21 shows a flowchart representing details of the analysis carried out by the user-information-analyzing function 201.

The following description explains details of the analysis carried out by the user-information-analyzing function 201 of the commodity-information-notifying server 12 in the processing performed at the step S233 of the flowchart shown in FIG. 20 by referring to a flowchart shown in FIG. 21.

The flowchart shown in FIG. 21 starts with a step S251 at which the user-information-analyzing function 201 extracts information on users, concretely speaking, user IDs assigned to the users to which notice information is to be transmitted from the user-information database 21. The extraction of the user IDs is based on the commodity ID of a commodity described in the notice information to be transmitted, the commodity's categories described in the notice information, commodity IDs of commodities which users want to purchase as indicated by records stored in the user-information database 21 and information on categories of interest to users as indicated by records also stored in the user-information database 21.

At the next step S252, the user-information-analyzing function 201 retrieves criteria for selecting notification methods provided for the users indicated by the extracted user IDs as explained earlier by referring to FIG. 10 from the user-information database 21. At the next step S253, the user-information-analyzing function 201 selects one of the methods of notification, namely, the mail, short-message and fax methods, on the basis of the criterion for selecting a notification method for each of the users.

At the next step S254, the user-information-analyzing function 201 retrieves the connection destination or the address of the selected notification method for each of the users from the user-information database 21. At the next step S255, the user-information-analyzing function 201 retrieves the notice information specific to the notification methods selected in the processing carried out at the step S253 from the notice-information database 22 for each of the users prior to termination of the analysis.

In this way, the user-information-analyzing function 201 is capable of selecting users to receive notice information as well as a notification method for each of the users and acquiring a connection destination such as a phone number or an address for each of the selected notification methods. On the other hand, the user of the client terminal 11 is capable of receiving notice information by using a predetermined apparatus serving as the client terminal 11 as described in advance in information on the user.

Figure 22:
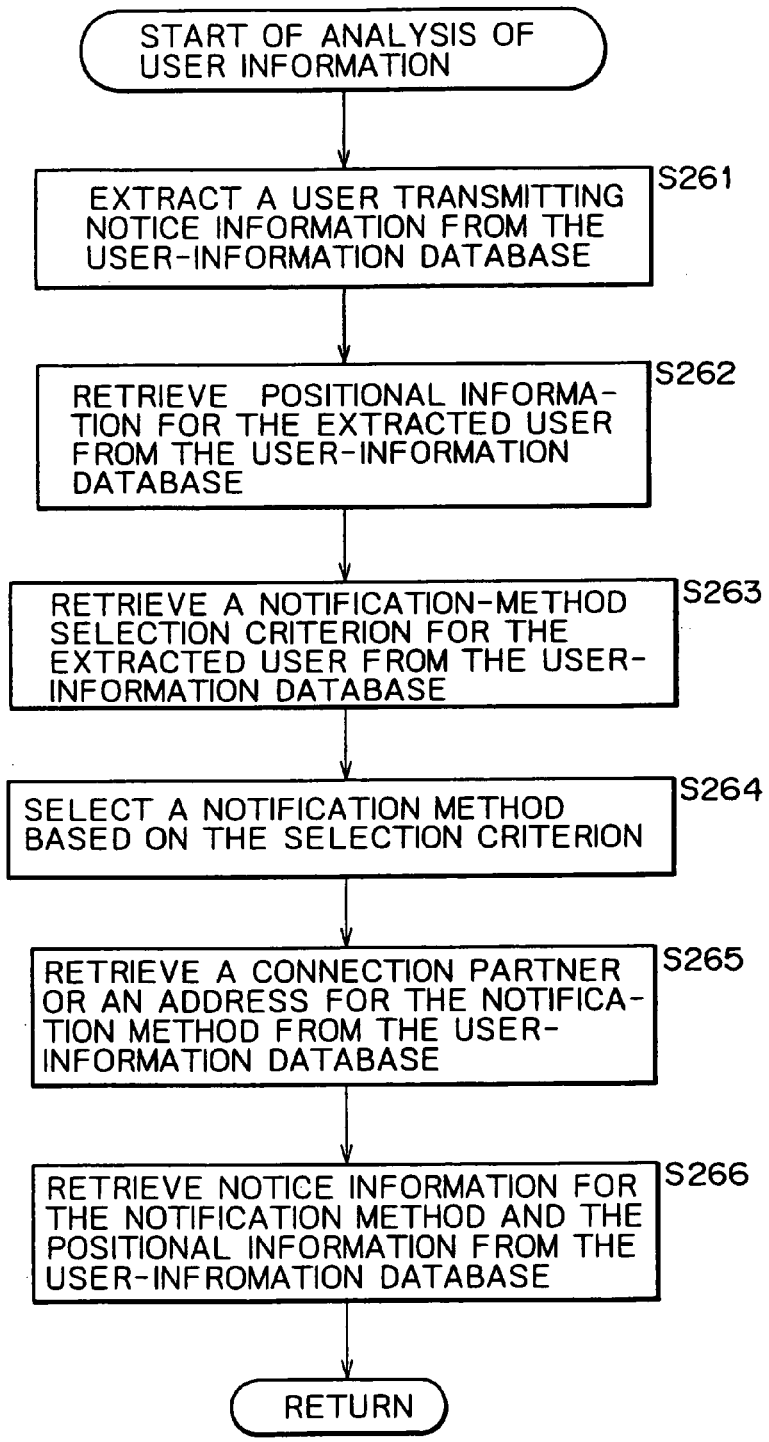
FIG. 22 shows a flowchart representing details of another implementation of the analysis carried out by the user-information-analyzing function 201.

The following description explains details of another implementation of the analysis carried out by the user-information-analyzing function 201 of the commodity-information-notifying server 12 in the processing performed at the step S233 of the flowchart shown in FIG. 20 by referring to a flowchart shown in FIG. 22. The flowchart shown in FIG. 22 starts with a step S261 at which the user-information-analyzing function 201 extracts information on users, concretely speaking, user IDs assigned to the users to which notice information is to be transmitted from the user-information database 21. The extraction of the user IDs is based on the commodity ID of a commodity described in the notice transformation to be transmitted, the commodity's categories described in the notice information, commodity IDs of commodities which users want to purchase as indicated by records stored in the user-information database 21 and information on categories of interest to users as indicated by records also stored in the user-information database 21.

At the next step S262, the user-information-analyzing function 201 retrieves a piece of information on a position for each of the users identified by the users ID extracted in the processing carried out at the step S261 from the user-information database 21. At the next step S263, the user-information-analyzing function 201 retrieves criteria for selecting notification methods provided for the users indicated by the extracted user IDs as explained earlier by referring to FIG. 10 from the user-information database 21. At the next step S264, the user-information-analyzing function 201 selects one of the methods of notification, namely, the mail, short-message and fax methods, on the basis of the criterion for selecting a notification method for each of the users.

At the next step S265, the user-information-analyzing function 201 retrieves the connection destination or the address of the selected notification method for each of the users from the user-information database 21. At the next step S266, the user-information-analyzing function 201 retrieves the notice information specific to the notification method selected in the processing carried out at the step S264 and the information on a position selected in the processing carried out at the step S262 from the notice-information database 22 shown in FIG. 17 for each of the users prior to termination of the analysis.

In this way, the user-information-analyzing function 201 is capable of acquiring notice information for information on the position of the client terminal 11. The commodity-information-notifying server 12 is thus capable of transmitting the notice information for information on the position of the client terminal 11 to the client terminal 11.

For example, the commodity-information-notifying server 12 transmits notice information including a map of a store closest to the present position of the client terminal 11 to the client terminal 11. The map allows the user of the client terminal 11 to purchase a commodity described by the notice information at the store shown on the map.

In this way, the user of the client terminal 11 is capable of purchasing a commodity described by the notice information at a store closest to the present position of the client terminal 11.

Figure 23:
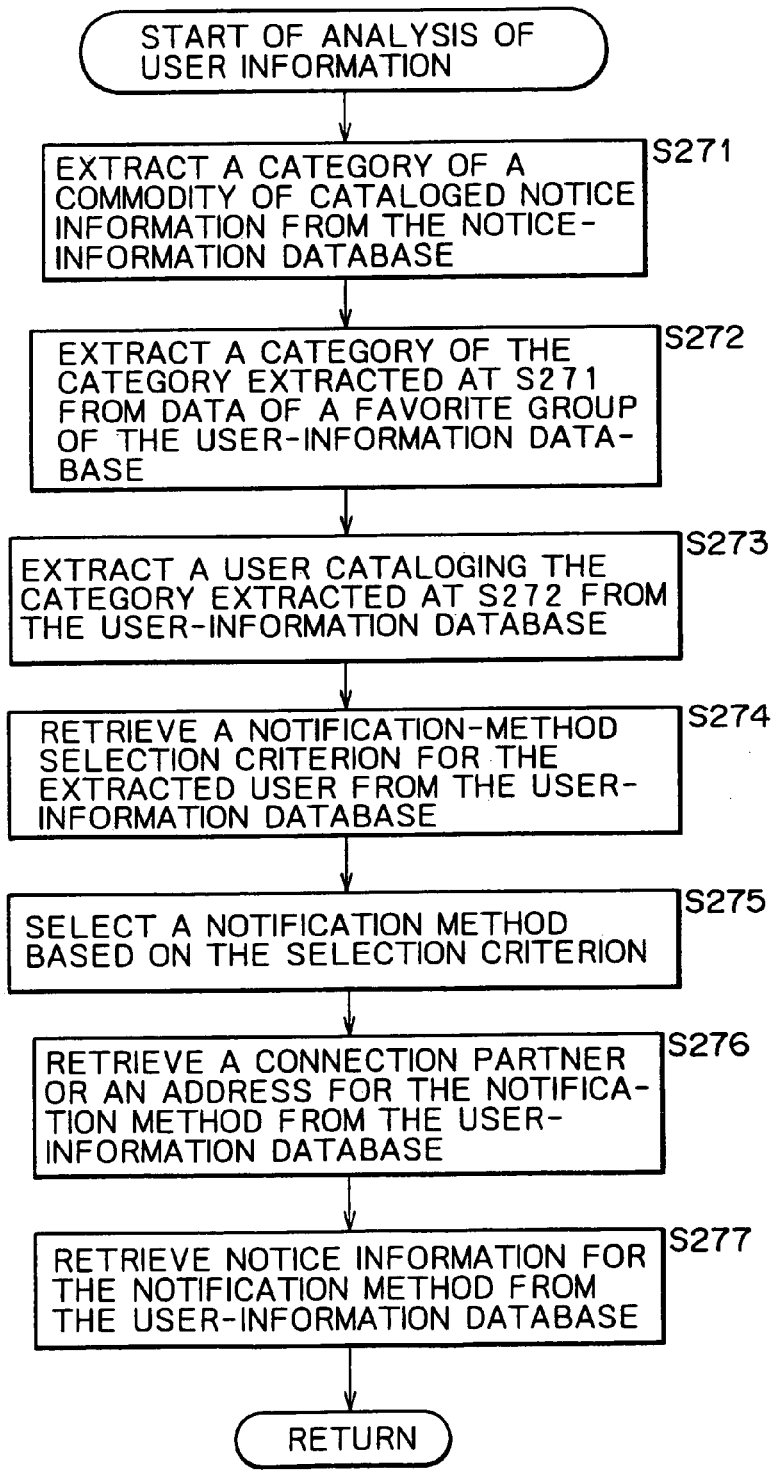
FIG. 23 shows a flowchart representing details of a further implementation of the analysis carried out by the user-information-analyzing function 201.

The following description explains details of a further implementation of the analysis carried out by the user-information-analyzing function 201 of the commodity-information-notifying server 12 in the processing performed at the step S233 of the flowchart shown in FIG. 20 by referring to a flowchart shown in FIG. 23.

The flowchart shown in FIG. 23 starts with a step S271 at which the user-information-analyzing function 201 extracts a category of a commodity indicated by recorded notice information from the notice-information database 22. At the next step S272, the user-information-analyzing function 201 extracts a category pertaining to the same favoritism group as the category extracted in the processing carried out at the step S271 from the user-information database 21.

At the next step S273, the user-information-analyzing function 201 extracts information on users, concretely speaking, user IDs assigned to the users interested in the category extracted in the processing carried out at the step S271 and most likely interested in the category extracted in the processing carried out at the step S272 from the user-information database 21.

At the next step S274, the user-information-analyzing function 201 retrieves criteria for selecting notification methods provided for the users indicated by the user IDs extracted in the processing carried out at the step S273 from the user-information database 21. At the next step S275, the user-information-analyzing function 201 selects one of the methods of notification, namely, the mail, short-message and fax methods, on the basis of the criterion for selecting a notification method for each of the users.

At the next step S276, the user-information-analyzing function 201 retrieves the connection destination or the address of the selected notification method for each of the users from the user-information database 21. At the next step S277, the user-information-analyzing function 201 retrieves the notice information specific to the notification method selected in the processing carried out at the step S275 and the information on a position selected in the processing carried out at the step S262 from the notice-information database 22 shown in FIG. 17 for each of the users prior to termination of the analysis.

In this way, since the user-information-analyzing function 201 selects not only a user interested in a commodity described in the notice information to be transmitted to the user, but also a user most likely interested in the commodity, the commodity-information-notifying server 12 is capable of transmitting the notice information to a greater number of users interested or most likely interested in a commodity described in the information.

Figure 24:
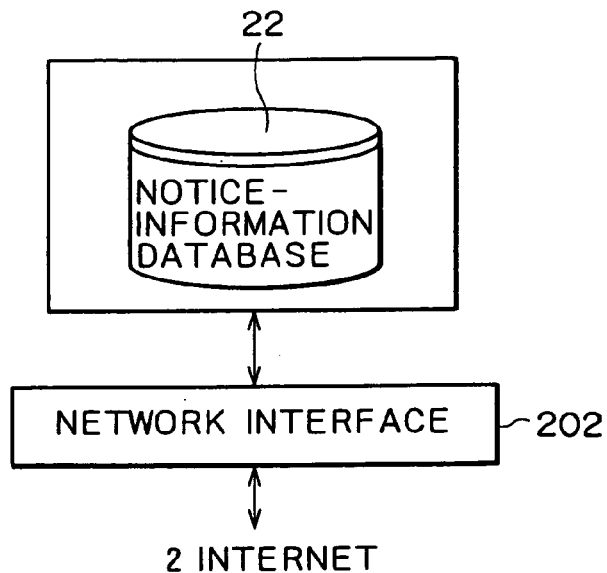
FIG. 24 is an explanatory diagram showing a configuration of other functions of the commodity-information-notifying server 12.

Next, another embodiment implementing the sales system provided by the present invention is explained. FIG. 24 is an explanatory diagram showing another functional configuration of the commodity-information-notifying server 12. The commodity-information-notifying server 12 carries out its functions by execution of predetermined programs. As shown in the figure, the commodity-information-notifying server 12 comprises the notice-information database 22 and the network-interface 202. Since the commodity-information-notifying server 12 shown in FIG. 24 does not have the user-information database 21 and the user-information-analyzing function 201, the configuration is simple in comparison with that shown in FIG. 6.

Figure 25:
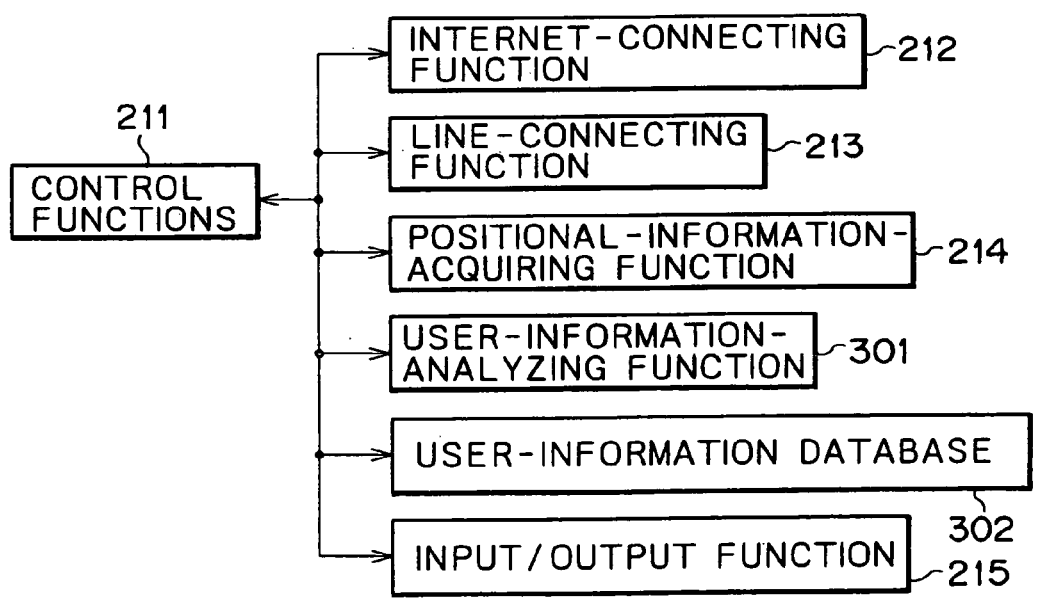
FIG. 25 is an explanatory diagram showing a configuration of other functions of the client terminal 11 which are each implemented by execution of a predetermined program.

FIG. 25 is an explanatory diagram showing another configuration of functions of the client terminal 11 which are implemented by execution of predetermined programs. Functions identical with those shown in FIG. 7 are denoted by the same reference numerals as the latter and the explanation of the identical functions is not repeated.

A user-information-analyzing function 301 has a function similar to that of the user-information-analyzing function 201, selecting some pieces of notice information to be displayed among those received from the commodity-information-notifying server 12 on the basis of, among others, information on present position of the client terminal 11 utilized by the user and information on categories each serving as a favorite with the user which are stored in a user-information database 302.

Much like the user-information database 21, the user-information database 302 is used for storing information on the present position of the client terminal 11 utilized by the user and information on categories each serving as a favorite with the user.

The following description explains processing carried out by the client terminal 11 having the configuration shown in FIG. 25 by referring to a flowchart shown in FIG. 26. The flowchart shown in FIG. 26 begins with a step S181 at which the control function 211 of the client terminal 11 requests the input/output function 215 to drive the input unit 155 to receive information on the user entered by operating the input unit 155.

At the next step S182, the control function 211 of the client terminal 11 requests the user-information database 302 to store the user information received in the processing carried out at the step S181. The processing is then terminated.

In this way, the user-information database 302 employed in the client terminal 11 is used for storing input information on the user.

The following description explains other processing carried out by the commodity-information-notifying server 12 also to transmit notice information to the client terminal 11 by referring to a flowchart shown in FIG. 27. Pieces of processing carried out at steps S391 to S393 are identical with those carried out at respectively the steps S331 to S333 of the flowchart shown in FIG. 20, making it unnecessary to repeat their explanation.

At a step S293, the network-interface 202 employed in the commodity-information-notifying server 12 requests the communication unit 158 to establish a connection with the client terminal 11 through the Internet 2. At the next step S294, the network-interface 202 employed in the commodity-information-notifying server 12 retrieves notice information from the notice-information database 22 and transmits the retrieved notice information to the client terminal 11.

At the next step S295, the network-interface 202 employed in the commodity-information-notifying server 12 cuts the connection established in the processing carried out at the step 293, that is, the connection with the client terminal 11.

The pieces of processing of the steps S293 to S295 are carried out repeatedly till all the client terminals 11 are informed of the notice information.

At a step S192, the control function 211 of the client terminal 11 requests the user-information-analyzing function 301 to form a judgment as to whether or not it is necessary to display the received notice information. The formation of the judgment is based on information on a category serving as a favorite with the user of the client terminal 11. Such information is stored in the user-information database 302.

If the outcome of the judgment formed at the step S192 indicates that it is not necessary to display the received notice information, the processing is ended by skipping the subsequent steps.

If the outcome of the judgment formed at the step S192 indicates that it is necessary to display the received notice information, on the other hand, the flow of the processing goes on to a step S193 at which the control function 211 of the client terminal 11 displays the received notice information on the display unit 156.

Pieces of processing carried out at steps S194 to S196 are identical with those carried out at respectively the steps S133 to S135 of the flowchart shown in FIG. 20, making it unnecessary to repeat their explanation.

In this way, the client terminal 11 is capable of selecting notice information of interest or useful to the user of the client terminal 11 among pieces of received notice information on the basis of information stored in the user-information database 302, and displaying the selected information.

It should be noted that the processing carried out at the step S192 can be made the same as the processing carried out at the step S233 of the flowchart shown in FIG. 20.

The series of pieces of processing described above can each be carried out by hardware or software. If a series of pieces of processing described is carried out by software, programs composing the software are executed by a computer including dedicated hardware embedded in the computer. As an alternative, the programs can also be installed from a program-storing medium into typically a general-purpose personal computer which is capable of performing a variety of functions by execution of a variety of programs installed therein.

As shown in FIG. 4 or 5, program-storing media for storing programs to be installed in a computer in a state executable by the computer are the magnetic disc 121 or 181 including a floppy disc, the optical disk 122 or 182 including a CD-ROM (Compact Disc-Read Only Memory) and a DVD (Digital Versatile Disc), the magneto-optical disk 123 or 183 including an MD (Mini-Disc), package media such as the semiconductor memory 124 or 184, the ROM 102 or 152 for permanently storing a program and a hard disk incorporated in the HDD 111 and used for temporarily storing a program, to mention a few. If necessary, a program can be loaded onto some of the program-storing media through the communication unit 113 or 158 serving as an interface with a router or a modem by using a wire or radio communication means such as a local area network, the Internet 2 or digital satellite broadcasting.

It should be noted that, in this specification, while steps prescribed in a program recorded in a recording medium can of course be executed sequentially along the time axis in an order the steps are prescribed in the program, the steps are not always executed sequentially along the time axis. That is to say, a program may include steps that are executed concurrently or individually.

In addition, the technical term 'hardware system' used in this specification means the whole equipment comprising a plurality of apparatuses.

In accordance with the above described information-presenting apparatus as in the first aspect, the information-presenting method as in the second aspect and the program-storing medium as in the third aspect, a first information transmission destination and a second information transmission destination are held; a criterion for selecting either the first information transmission destination or the second information transmission destination is held; either the first information transmission destination or the second information transmission destination is selected on the basis of the criterion; and transmission of information to either the selected first information transmission destination or the selected second information transmission destination is controlled.

As a result, it is possible to select a desired transmission destination and transmit information to the selected transmission destination.

In accordance with the above-described information-processing apparatus as in the fourth aspect, the information-processing method as in the fifth aspect and the program-storing medium as in the sixth aspect, an operation to input transmitted information on a first transmission destination, a second transmission destination and a criterion for selecting either the first transmission destination or the second transmission destination from an information-presenting apparatus is controlled; and transmission of information on the first transmission destination, the second transmission destination and a criterion for selecting either the first transmission destination or the second transmission destination to the information-presenting apparatus is controlled.

As a result, it is possible to select a desired transmission destination and transmit information to the selected transmission destination.

In accordance with the above-described information-presenting apparatus as in the seventh aspect, the information-presenting method as in the eighth aspect and the program-storing medium as in the ninth aspect, first favorite-commodity information indicating the degree of favoritism for commodities of a fist category and second favorite-commodity information indicating the degree of favoritism for commodities of a second category are held; favoritism-probability information showing a probability of a first-category product's serving as a favorite with a user fond of products of the second category is computed on the basis of the first favorite-commodity information and the second favorite-commodity information; the first category is recorded by associating the first category with the favoritism-probability information calculated with respect to the second category; a user fond of products of the second category is selected on the basis of the held second favorite-commodity information in transmission of information on a products of the first category in case the first category associated with the favoritism-probability information calculated with respect to the second category is recorded; and transmission of information on commodities of the first category is controlled so as to transmit the information on commodities of the first category to an information-processing apparatus used by the selected user is controlled.

As a result, it is possible to let information on commodities be viewed by a number of users each most likely interested in the commodities.

In accordance with the above-described information-presenting apparatus as in the tenth aspect, the information-presenting method as in the eleventh aspect and the program-storing medium as in the twelfth aspect, positional information indicating the present position of an information-processing apparatus is held; pieces of information are held by associating the pieces of information with sub-areas of a movement range of the information-processing apparatus; one of the pieces of information associated with one of the sub-ranges including the information-processing apparatus' present position indicated by the positional information is selected; and transmission of the selected piece of information to the information-processing apparatus is controlled.

As a result, it is possible to transmit information suitable for a location to which the information-processing apparatus has moved.

While the preferred embodiment of the present invention has been described using the specific terms, such description is for illustrative purposes only, and it is to be understood that changes and variations may be made without departing from the spirit or scope of the following claims.

What is claimed is:

1. An information-processing apparatus comprising:
   an interface configured to control an operation to input criterion for selecting whether to receive information from a first transmission destination or a second transmission destination from an information-presenting apparatus;
   the interface further configured to control a second operation to input first favorite-commodity information indicating a degree of favoritism for one or more of major commodities of a first category;
   the interface further configured to control a third operation to input second favorite-commodity information indicating a degree of favoritism for one or more of commodities of a corresponding sub-category of each of said one or more major commodities of said first category;
   a transmission controller configured to control transmission of information on said first transmission destination, said second transmission destination and a criterion for selecting either said first transmission destination or said second transmission destination to said information-presenting apparatus, wherein said information-presenting apparatus is configured to store commodity information corresponding to a geographic location, and
   wherein said criteria includes information corresponding to a geographic location of at least one of the first and second transmission destinations and said information-presenting apparatus is configured to store and transmit commodity information corresponding to said first favorite-commodity information, said second favorite-commodity information, and the geographic location of at least one of said first and second transmission destinations based on a determined geographic location of the at least one of said first and second transmission destinations.

2. An information-processing apparatus according to claim 1, wherein said interface further controls an operation to input transmission-method information indicating a first transmission method for said first transmission destination and a second transmission method for said second transmission destination, whereas said transmission controller is capable of controlling transmission of information on transmission methods to said information-presenting apparatus.

3. An information-processing method comprising:
   an input control step of controlling an operation to input criterion for selecting whether to receive information from a first transmission destination or said second transmission destination from an information-presenting apparatus; a second input control step of controlling a second operation to input first favorite-commodity information indicating a degree of favoritism for one or more of major commodities of a first category;
   a third input control step of controlling a third operation to input second favorite-commodity information indicating a degree of favoritism for one or more of commodities of a corresponding sub-category of each of said one or more major commodities of said first category;
   a transmission control step of controlling transmission of information on said first transmission destination, said second transmission destination and a criterion for selecting either said first transmission destination or said second transmission destination to said information-presenting apparatus, wherein said information-presenting apparatus is configured to store commodity information corresponding to a geographic location, and
   wherein said criteria includes information corresponding to a geographic location of at least one of the first and second transmission destinations and said information-presenting apparatus is configured to store and transmit commodity information corresponding to said first favorite-commodity information, said second favorite-commodity information, and the geographic location of at least one of said first and second transmission destinations based on a determined geographic location of the at least one of said first and second transmission destinations.

4. A program-storing medium for storing a computer-executable program, which when executed by a computer causes the computer to perform an information processing method, comprising:
   an input control step of controlling an operation to input criterion for selecting whether to receive information from a first transmission destination or said second transmission destination from an information-presenting apparatus;
   a second input control step of controlling a second operation to input first favorite-commodity information indicating a degree of favoritism for one or more of major commodities of a first category;
   a third input control step of controlling a third operation to input second favorite-commodity information indicating a degree of favoritism for one or more of commodities of a corresponding sub-category of each of said one or more major commodities of said first category;
   a transmission control step of controlling transmission of information on said first transmission destination, said second transmission destination and a criterion for selecting either said first transmission destination or said second transmission destination to said information-presenting apparatus wherein said information-presenting apparatus is configured to store commodity information corresponding to a geographic location, and
   wherein said criteria includes information corresponding to a geographic location of at least one of the first and second transmission destinations and said information-presenting apparatus is configured to store and transmit commodity information corresponding to said first favorite-commodity information, said second favorite-commodity information, and the geographic location of at least one of said first and second transmission destinations based on a determined geographic location of the at least one of said first and second transmission destinations.

* * * * *